(12) United States Patent
Pakhomov et al.

(10) Patent No.: US 9,576,593 B2
(45) Date of Patent: Feb. 21, 2017

(54) AUTOMATED VERBAL FLUENCY ASSESSMENT

(71) Applicant: Regents of the University of Minnesota, Minneapolis, MN (US)

(72) Inventors: Serguei V. S. Pakhomov, Minneapolis, MN (US); Laura Sue Hemmy, Minneapolis, MN (US); Kelvin O. Lim, Vadnais Heights, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 185 days.

(21) Appl. No.: 14/379,654

(22) PCT Filed: Mar. 14, 2013

(86) PCT No.: PCT/US2013/031540
§ 371 (c)(1),
(2) Date: Aug. 19, 2014

(87) PCT Pub. No.: WO2013/138633
PCT Pub. Date: Sep. 19, 2013

(65) Prior Publication Data
US 2015/0058013 A1 Feb. 26, 2015

Related U.S. Application Data

(60) Provisional application No. 61/611,250, filed on Mar. 15, 2012.

(51) Int. Cl.
*G10L 25/87* (2013.01)
*G10L 15/00* (2013.01)
(Continued)

(52) U.S. Cl.
CPC ............... *G10L 25/87* (2013.01); *G10L 15/02* (2013.01); *G10L 15/08* (2013.01); *G10L 25/48* (2013.01);
(Continued)

(58) Field of Classification Search
CPC ........ G10L 15/00; G10L 15/005; G10L 15/01; G10L 15/26; G10L 15/18; G10L 25/48; G10L 25/51; G10L 25/78; G10L 25/93; G10L 2025/00; G10L 2025/783; G10L 2025/90; G10L 2025/93; G09B 21/00
(Continued)

(56) References Cited

U.S. PATENT DOCUMENTS

| 4,194,590 A | 3/1980 | Anderson et al. |
| 4,490,840 A | 12/1984 | Jones |

(Continued)

FOREIGN PATENT DOCUMENTS

| CN | 101983613 A | 3/2011 |
| WO | WO 2009067323 A1 | 5/2009 |

OTHER PUBLICATIONS

Fuchs, Lynn S. Douglas Fuchs, and Donald L. Compton. "Monitoring early reading development in first grade: Word identification fluency versus nonsense word fluency." Exceptional Children 71.1 (2004): 7-21.*

(Continued)

*Primary Examiner* — Paras D Shah
(74) *Attorney, Agent, or Firm* — Shumaker & Sieffert, P.A.

(57) ABSTRACT

Techniques are described for calculating one or more verbal fluency scores for a person. An example method includes classifying, by a computing device, samples of audio data of speech of a person, based on amplitudes of the samples, into a first class of samples including speech or sound and a (Continued)

second class of samples including silence. The method further includes analyzing the first class of samples to determine a number of words spoken by the person, and calculating a verbal fluency score for the person based at least in part on the determined number of words spoken by the person.

20 Claims, 8 Drawing Sheets

(51) Int. Cl.
    *G10L 15/08*     (2006.01)
    *G10L 25/66*     (2013.01)
    *G10L 15/02*     (2006.01)
    *G10L 25/48*     (2013.01)
    *G10L 25/78*     (2013.01)

(52) U.S. Cl.
    CPC .............. *G10L 25/66* (2013.01); *G10L 25/78* (2013.01); *G10L 2025/783* (2013.01)

(58) Field of Classification Search
    USPC ....... 704/210, 211, 231, 251, 270, 271, 272, 704/275; 434/156, 167, 178, 185
    See application file for complete search history.

(56) References Cited

U.S. PATENT DOCUMENTS

| | | | |
|---|---|---|---|
| 4,816,994 A | 3/1989 | Freiling et al. | |
| 4,852,180 A | 7/1989 | Levinson | |
| 4,914,590 A | 4/1990 | Loatman et al. | |
| 4,974,191 A | 11/1990 | Amirghodsi et al. | |
| 5,040,214 A | 8/1991 | Grossberg et al. | |
| 5,163,111 A | 11/1992 | Baji et al. | |
| 5,218,529 A | 6/1993 | Meyer et al. | |
| 5,228,087 A | 7/1993 | Bickerton | |
| 5,278,980 A | 1/1994 | Pedersen et al. | |
| 5,331,544 A | 7/1994 | Lu et al. | |
| 5,333,275 A | 7/1994 | Wheatley et al. | |
| 5,426,745 A | 6/1995 | Baji et al. | |
| 5,459,814 A * | 10/1995 | Gupta ..................... G10L 25/78 704/214 | |
| 5,519,805 A | 5/1996 | King | |
| 5,598,510 A | 1/1997 | Castelaz | |
| 5,613,013 A | 3/1997 | Schuette | |
| 5,623,609 A | 4/1997 | Kaye et al. | |
| 5,627,942 A | 5/1997 | Nightingale et al. | |
| 5,634,086 A * | 5/1997 | Rtischev ............... G09B 19/06 434/185 | |
| 5,649,061 A | 7/1997 | Smyth | |
| 5,652,828 A | 7/1997 | Silverman | |
| 5,680,524 A | 10/1997 | Maples et al. | |
| 5,717,828 A | 2/1998 | Rothenberg | |
| 5,722,418 A | 3/1998 | Bro | |
| 5,732,395 A | 3/1998 | Silverman | |
| 5,749,071 A | 5/1998 | Silverman | |
| 5,751,906 A | 5/1998 | Silverman | |
| 5,774,357 A | 6/1998 | Hoffberg et al. | |
| 5,774,591 A | 6/1998 | Black et al. | |
| 5,799,276 A | 8/1998 | Komissarchik et al. | |
| 5,802,220 A | 9/1998 | Black et al. | |
| 5,806,028 A | 9/1998 | Lyberg | |
| 5,813,862 A | 9/1998 | Merzenich et al. | |
| 5,832,435 A | 11/1998 | Silverman | |
| 5,870,709 A | 2/1999 | Bernstein | |
| 5,875,108 A | 2/1999 | Hoffberg et al. | |
| 5,885,083 A | 3/1999 | Ferrell | |
| 5,890,117 A | 3/1999 | Silverman | |
| 5,914,720 A | 6/1999 | Maples et al. | |
| 5,920,477 A | 7/1999 | Hoffberg et al. | |
| 5,927,988 A | 7/1999 | Jenkins et al. | |
| 5,999,895 A | 12/1999 | Forest | |
| 5,999,904 A | 12/1999 | Brown et al. | |
| 6,005,549 A | 12/1999 | Forest | |
| 6,018,736 A | 1/2000 | Gilai et al. | |
| 6,019,607 A | 2/2000 | Jenkins et al. | |
| 6,044,347 A | 3/2000 | Abella et al. | |
| 6,044,365 A | 3/2000 | Cannon et al. | |
| 6,068,485 A | 5/2000 | Linebarger et al. | |
| 6,071,123 A | 6/2000 | Tallal et al. | |
| 6,085,162 A | 7/2000 | Cherny | |
| 6,113,393 A | 9/2000 | Neuhaus | |
| 6,115,482 A | 9/2000 | Sears et al. | |
| 6,120,298 A | 9/2000 | Jenkins et al. | |
| 6,123,548 A | 9/2000 | Tallal et al. | |
| 6,128,596 A | 10/2000 | Mackie | |
| 6,134,529 A | 10/2000 | Rothenberg | |
| 6,146,147 A | 11/2000 | Wasowicz | |
| 6,151,571 A | 11/2000 | Pertrushin | |
| 6,157,913 A | 12/2000 | Bernstein | |
| 6,159,014 A | 12/2000 | Jenkins et al. | |
| 6,160,536 A | 12/2000 | Forest | |
| 6,166,739 A | 12/2000 | Hugh | |
| 6,169,981 B1 | 1/2001 | Werbos | |
| 6,181,996 B1 | 1/2001 | Chou et al. | |
| 6,208,963 B1 | 3/2001 | Martinez et al. | |
| 6,249,606 B1 | 6/2001 | Kiraly et al. | |
| 6,256,630 B1 | 7/2001 | Gilai et al. | |
| 6,261,101 B1 | 7/2001 | Benitz et al. | |
| 6,272,479 B1 | 8/2001 | Farry et al. | |
| 6,275,806 B1 | 8/2001 | Pertrushin | |
| 6,293,801 B1 | 9/2001 | Jenkins et al. | |
| 6,299,452 B1 | 10/2001 | Wasowicz et al. | |
| 6,302,697 B1 | 10/2001 | Tallal et al. | |
| 6,311,159 B1 | 10/2001 | Van Tichelen et al. | |
| 6,327,568 B1 | 12/2001 | Joost | |
| 6,334,778 B1 | 1/2002 | Brown | |
| 6,338,039 B1 | 1/2002 | Lonski et al. | |
| 6,350,128 B1 | 2/2002 | Neuhaus | |
| 6,351,273 B1 | 2/2002 | Lemelson et al. | |
| 6,353,810 B1 | 3/2002 | Petrushin | |
| 6,353,814 B1 | 3/2002 | Weng | |
| 6,384,829 B1 | 5/2002 | Prevost et al. | |
| 6,386,881 B1 | 5/2002 | Jenkins et al. | |
| 6,400,996 B1 | 6/2002 | Hoffberg et al. | |
| 6,405,161 B1 | 6/2002 | Goldsmith | |
| 6,413,092 B1 | 7/2002 | Tallal et al. | |
| 6,413,093 B1 | 7/2002 | Tallal et al. | |
| 6,413,094 B1 | 7/2002 | Tallal et al. | |
| 6,413,095 B1 | 7/2002 | Tallal et al. | |
| 6,413,096 B1 | 7/2002 | Tallal et al. | |
| 6,413,097 B1 | 7/2002 | Tallal et al. | |
| 6,413,098 B1 | 7/2002 | Tallal et al. | |
| 6,421,064 B1 | 7/2002 | Lemelson et al. | |
| 6,427,137 B2 | 7/2002 | Petrushin | |
| 6,435,877 B2 | 8/2002 | Wasowicz | |
| 6,438,523 B1 | 8/2002 | Oberteuffer et al. | |
| 6,453,292 B2 | 9/2002 | Ramaswamy et al. | |
| 6,463,415 B2 | 10/2002 | St. John | |
| 6,480,826 B2 | 11/2002 | Pertrushin | |
| 6,511,324 B1 | 1/2003 | Wasowicz | |
| 6,526,382 B1 * | 2/2003 | Yuschik ............... G10L 15/1822 704/257 | |
| 6,529,889 B1 | 3/2003 | Bromberg et al. | |
| 6,533,584 B1 | 3/2003 | Jenkins et al. | |
| 6,567,775 B1 | 5/2003 | Maali et al. | |
| 6,581,046 B1 | 6/2003 | Ahissar | |
| 6,585,517 B2 | 7/2003 | Wasowicz | |
| 6,585,518 B1 | 7/2003 | Jenkins et al. | |
| 6,585,519 B1 | 7/2003 | Jenkins et al. | |
| 6,587,572 B1 | 7/2003 | Suchenwirth-Bauersachs et al. | |
| 6,594,629 B1 | 7/2003 | Basu et al. | |
| 6,598,022 B2 | 7/2003 | Yuschik | |
| 6,603,491 B2 | 8/2003 | Lemelson et al. | |
| 6,606,744 B1 | 8/2003 | Mikurak | |
| 6,629,844 B1 | 10/2003 | Jenkins et al. | |
| 6,640,145 B2 | 10/2003 | Hoffberg et al. | |
| 6,671,818 B1 | 12/2003 | Mikurak | |
| 6,676,412 B1 | 1/2004 | Masterson et al. | |
| 6,681,031 B2 | 1/2004 | Cohen et al. | |
| 6,690,268 B2 | 2/2004 | Schofield et al. | |

(56) References Cited

U.S. PATENT DOCUMENTS

| | | |
|---|---|---|
| 6,697,457 B2 | 2/2004 | Petrushin |
| 6,718,232 B2 | 4/2004 | Fujita et al. |
| 6,755,657 B1 | 6/2004 | Wasowicz |
| 6,789,054 B1 | 9/2004 | Makhlouf |
| 6,816,836 B2 | 11/2004 | Basu et al. |
| 6,823,312 B2 | 11/2004 | Mittal et al. |
| 6,829,603 B1 | 12/2004 | Wolf et al. |
| 6,850,252 B1 | 2/2005 | Hoffberg |
| 6,868,422 B2 | 3/2005 | Turner et al. |
| 6,874,127 B2 | 3/2005 | Newell et al. |
| 6,882,992 B1 | 4/2005 | Webos |
| 6,884,078 B2 | 4/2005 | Wiig et al. |
| 6,889,216 B2 | 5/2005 | Nugent |
| 6,903,723 B1 | 6/2005 | Forest |
| 6,910,027 B2 | 6/2005 | Bromberg et al. |
| 6,937,975 B1 | 8/2005 | Elworthy |
| 6,944,603 B2 | 9/2005 | Bergan et al. |
| 6,950,534 B2 | 9/2005 | Cohen et al. |
| 6,963,839 B1 | 11/2005 | Ostermann et al. |
| 6,963,841 B2 | 11/2005 | Handal et al. |
| 6,964,023 B2 | 11/2005 | Maes et al. |
| 6,971,993 B2 | 12/2005 | Fletcher |
| 6,982,635 B2 | 1/2006 | Obradovich |
| 6,993,381 B2 | 1/2006 | Connelly et al. |
| 6,995,649 B2 | 2/2006 | Nugent |
| 7,006,881 B1 | 2/2006 | Hoffberg et al. |
| 7,007,001 B2 | 2/2006 | Oliver et al. |
| 7,007,067 B1 | 2/2006 | Azvine et al. |
| 7,023,979 B1 | 4/2006 | Wu et al. |
| 7,028,017 B2 | 4/2006 | Nugent |
| 7,036,128 B1 | 4/2006 | Julia et al. |
| 7,039,619 B2 | 5/2006 | Nugent |
| 7,062,220 B2 | 6/2006 | Haynes et al. |
| 7,062,441 B1 | 6/2006 | Townshend |
| 7,076,472 B2 | 7/2006 | Addison |
| 7,079,986 B2 | 7/2006 | Sieracki |
| 7,089,188 B2 | 8/2006 | Logan et al. |
| 7,091,976 B1 | 8/2006 | Ostermann et al. |
| 7,098,788 B2 | 8/2006 | Giraldo et al. |
| 7,107,252 B2 | 9/2006 | Nugent |
| 7,113,848 B2 | 9/2006 | Hanson |
| 7,124,101 B1 | 10/2006 | Mikurak |
| 7,129,857 B1 | 10/2006 | Spirkovska |
| 7,129,932 B1 | 10/2006 | Klarlund et al. |
| 7,130,807 B1 | 10/2006 | Mikurak |
| 7,136,710 B1 | 11/2006 | Hoffberg et al. |
| 7,139,706 B2 | 11/2006 | Yuschik |
| 7,152,034 B1 | 12/2006 | Layng et al. |
| 7,187,790 B2 | 3/2007 | Sabol et al. |
| 7,194,411 B2 | 3/2007 | Slotznick et al. |
| H2187 H | 4/2007 | Yuchimiuk |
| 7,203,648 B1 | 4/2007 | Ostermann et al. |
| 7,203,649 B1 | 4/2007 | Linebarger et al. |
| 7,203,910 B1 | 4/2007 | Hugh et al. |
| 7,209,923 B1 | 4/2007 | Cooper |
| 7,211,050 B1 | 5/2007 | Caplygin |
| 7,231,395 B2 | 6/2007 | Fain et al. |
| 7,234,942 B2 | 6/2007 | Hu et al. |
| 7,243,130 B2 | 7/2007 | Horvitz et al. |
| 7,261,182 B2 | 8/2007 | Zainea |
| 7,263,530 B2 | 8/2007 | Hu et al. |
| 7,267,652 B2 | 9/2007 | Coyle et al. |
| 7,272,575 B2 | 9/2007 | Vega |
| 7,275,032 B2 | 9/2007 | Macleod |
| 7,277,752 B2 | 10/2007 | Matos |
| 7,280,964 B2 | 10/2007 | Wilson et al. |
| 7,286,793 B1 | 10/2007 | Miele |
| 7,305,381 B1 | 12/2007 | Poppink et al. |
| 7,307,509 B2 | 12/2007 | Chriss |
| 7,314,444 B2 | 1/2008 | Buschke |
| 7,319,958 B1 | 1/2008 | Melnar et al. |
| 7,319,992 B2 | 1/2008 | Gaos |
| 7,321,854 B2 | 1/2008 | Sharma et al. |
| 7,327,505 B2 | 2/2008 | Fedorovskaya et al. |
| 7,333,963 B2 | 2/2008 | Widrow et al. |
| 7,337,158 B2 | 2/2008 | Fratkina et al. |
| 7,349,782 B2 | 3/2008 | Churchhill et al. |
| 7,365,651 B2 | 4/2008 | Massey et al. |
| 7,455,522 B2* | 11/2008 | Polanyi .................... G09B 5/02 434/178 |
| 7,680,056 B2 | 3/2010 | Keyhl et al. |
| 8,494,857 B2 | 7/2013 | Pakhomov |
| 2004/0006461 A1* | 1/2004 | Gupta .................... G06F 17/289 704/200 |
| 2006/0115800 A1* | 6/2006 | Daley .................. G09B 21/006 434/185 |
| 2007/0011005 A1 | 1/2007 | Morrison et al. |
| 2007/0071206 A1* | 3/2007 | Gainsboro .......... H04M 3/2281 379/168 |
| 2007/0213982 A1* | 9/2007 | Xi ........................... G10L 15/26 704/243 |
| 2008/0004879 A1* | 1/2008 | Huang .................. G10L 15/142 704/270 |
| 2008/0312936 A1* | 12/2008 | Nam ........................ H04K 1/00 704/500 |
| 2009/0171661 A1* | 7/2009 | Jayadeva ................ G10L 15/26 704/250 |
| 2009/0191521 A1* | 7/2009 | Paul ........................ G10L 17/16 434/169 |
| 2009/0192788 A1* | 7/2009 | Yoshioka ................ G10L 25/93 704/206 |
| 2009/0258333 A1* | 10/2009 | Yu ........................... G09B 5/04 434/157 |
| 2009/0287064 A1 | 11/2009 | Dougherty, Jr. et al. |
| 2010/0174533 A1* | 7/2010 | Pakhomov ............ G10L 15/005 704/205 |
| 2011/0040554 A1* | 2/2011 | Audhkhasi .............. G10L 15/26 704/9 |
| 2011/0144993 A1* | 6/2011 | Ruby ...................... G10L 17/26 704/243 |
| 2011/0270605 A1* | 11/2011 | Qin ........................ G10L 25/48 704/9 |
| 2012/0089396 A1* | 4/2012 | Patel ...................... G10L 25/00 704/249 |
| 2012/0116772 A1* | 5/2012 | Jones .................. G06F 19/3418 704/270 |
| 2013/0304472 A1 | 11/2013 | Pakhomov |

OTHER PUBLICATIONS

"Alzheimer's Disease Overview, Brain Anatomy" HealthCommunities.com, retrieved from internet http://www.healthcommunities.com/alzheimers-disease/overview-of-alzheimers.shtml, Jan. 2, 2000, 3 pp.

"Cigna Medical Coverage Policy," Cigna, retrieved from internet https://cignaforhcp.cigna.com/public/content/pdf/coveragePolicies/medical/mm_0258_coveragepositioncriteria_neuropsychological_testing.pdf, Jul. 15, 2014, 34 pp.

"Coding for Reimbursement Frequently Asked Questions: Speech-Language Pathology," American Speech-Language-Hearing Association, retrieved from internet http://www.asha.org/practice/reimbursement/coding/coding_faqs_slp.htm on Sep. 29, 2014, 7 pp.

"Definition of Neuropsychology," PsychologistAnywhereAnytime.com, retrieved from internet http://www.psychologistanywhereanytime.com/tests_psychological/psychological_tests_neuro-psych.htm, 2005, 5 pp.

"Dementia Overview, Types, Incidence & Pevalence," HealthCommunities.com, retrieved from internet http://www.healthcommunities.com/dementia/dementia-overview-types,shtml, Jan. 2, 2000, 3 pp.

"Traumatic Brain Injury in the United States: Emergency Department Visits, Hospitalizations, and Deaths," Centers for Disease Control (CDC), retrieved from internet http://www.cdc.gov/ncipc/pub-res/tbi_in_us_04/tbi_ed.htm on Sep. 29, 2014, 2 pp.

"Voice-Recognition Market to Reach $58.4 Billion in 2015," Homeland Security News Wire, retrieved from internet: http://www.homelandsecuritynewswire.com/node/33387, Oct. 11, 2011, 2 pp.

"What is Neuropsychological Testing?," Bay Area Psychological Testing Associates (BAPTA), retrieved from internet http://www.bapta.com/np_testing.htm on Sep. 29, 2014, 2 pp.

(56) References Cited

OTHER PUBLICATIONS

Amano-Kusumoto et at, "Classifying Clear and Conversational Speech Based on Acoustic Features," InterSPEECH, 10$^{th}$ Annual Conference of the International Speech Communication Association, Sep. 2009, 4 pp.

Fernandez, "The Business and Ethics of the Brain Fitness boom ," Neuroscience of the Again Brain: Perspectives on Brain Health and Lifestyle, vol. 35(2), 2011, 9 pp.

Hosom et al., "Diagnostic Assessment of Childhood Apraxia of Speech Using Automatic Speech Recognition (ASR) Methods," J. Med. Speech Lang. Pathol., vol. 12(4), Dec. 2004, pp. 167-171.

Hosom, "Automatic Phoneme Alignment Based on Acoustic-Phonetic Modeling," 2002, 4 pp.

Jimison et al., "Horne-based Cognitive Monitoring using Ebedded Measures of Verbal Fluency in a Computer Word Game," Conference Proceedings of IEEE Eng. Med. Biol. Soc., Aug. 2008, 151 pp.

Pakhomov et at, "Automatic Detection of Rhythm Changes in the Speech of Patients with Fronto-temporal Dementia," Institute for Health Informatics, University of Minnesota, 2008, 4 pp.

Pakhomov et at, "Semi-Automatic Analysis of Spontaneous Verbal Descriptions Given by Adults with Frontotemporal Dementia," 2008, 1 pp.

Roark et al., "Automatically Derived Spoken Language Markers for Detecting Mild Cognitive Impairment," 2007, 4 pp.

Wightman et al., "Automatic Labeling of Prosodic Patterns," IEEE Transactions on Speech and Audio Processing, vol. 2, Oct. 1994, pp. 469-481.

Wightman et al., "Automatic Recognition of Prosodic Phrases," in International Conference on Acoustics, Speech, and Signal Processing, 1991.

Samudravijaya et al., "Pre-recognition Measures of Speaking Rate," Speech Communication, Elsevier Science Publishers, Amsterdam, NL, vol. 24(1), Apr. 1998, pp. 73-84.

"The Nun Study: Frequently Asked Questions," University of Minnesota, retrieved from internet www.healthstudies.umn.edu/nunstudy/faq.jsp, last modified Dec. 15, 2008, 2 pp.

"Psychological Testing FAQs," Magellan Behavioral Health, retrieved from internet https://www.magellanprovider.com/MHS/MGL/providing_care/clinical_guidelines/psych_testing.asp, Nov. 2012, 8 pp.

International Search Report and Written Opinion from Counterpart International Patent Application No. PCT/US2013/031540, mailed Jun. 14, 2013, 11 pp.

International Preliminary Report on Patentability from Counterpart International Patent Application No. PCT/US2013/031540, mailed Sep. 25, 2014, 8 pp.

\* cited by examiner

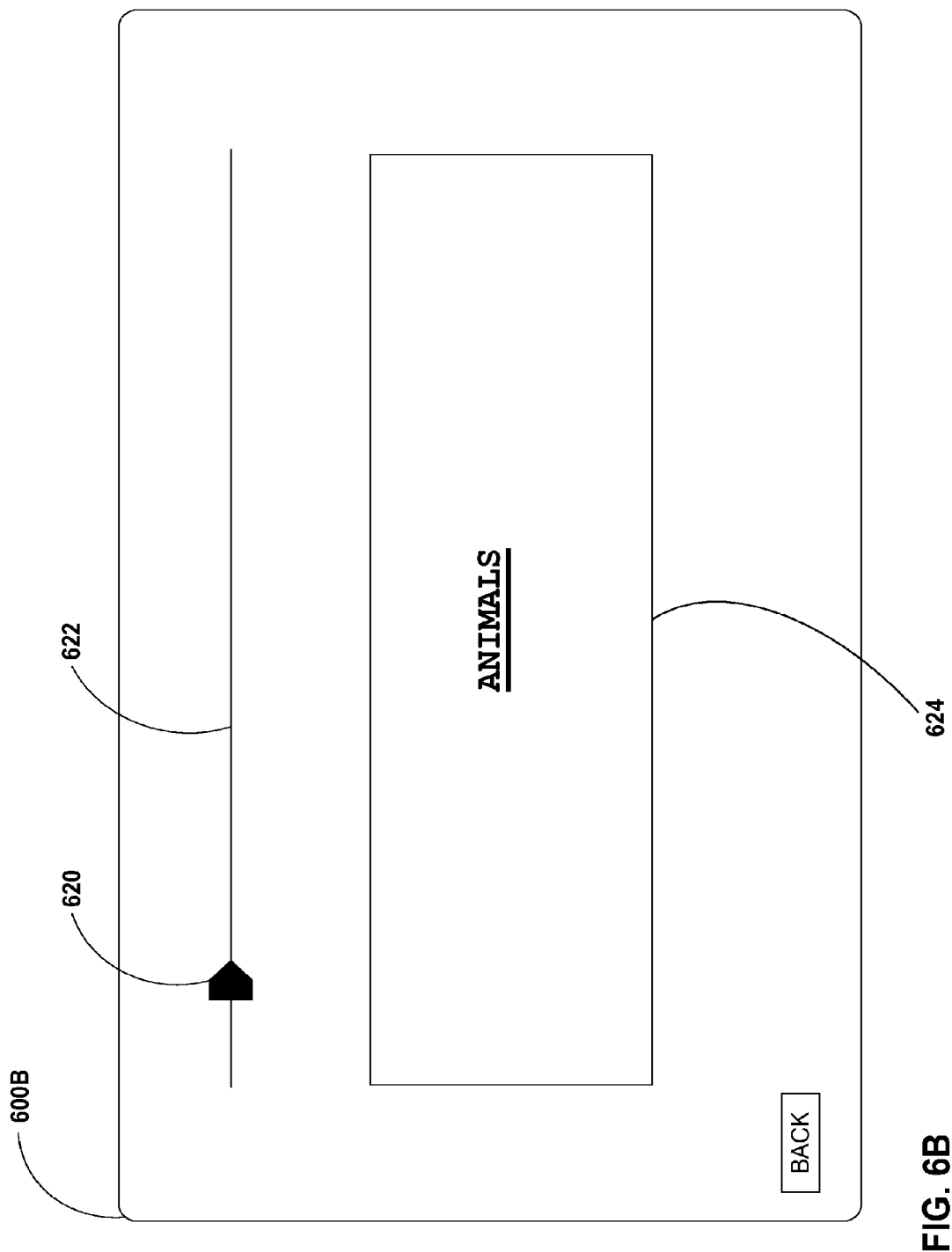

AUTOMATED VERBAL FLUENCY ASSESSMENT

This application is a national stage entry under 35 U.S.C. §371 of International Application No. PCT/US2013/031540, filed Mar. 14, 2013, which claims the benefit of U.S. Provisional Application Ser. No. 61/611,250, filed Mar. 15, 2012, the entire contents of each of which are hereby incorporated by reference.

TECHNICAL FIELD

This disclosure relates to computerized speech analysis systems.

BACKGROUND

Researchers and others have used computers to receive and automatically process speech in a variety of contexts. For example, computers have been programmed to receive a person's speech and transcribe the speech into an electronic document (i.e., speech-to-text). These applications of computerized speech analysis are known by the term "automatic speech recognition" (ASR). Current tools and approaches to ASR, however, lack accuracy and robustness in recognizing speech, whether spontaneous, instigated by a stimulus, or read from a script. ASR of spontaneous speech (unprepared conversational speech) is particularly challenging due to the individual speaker, and such challenges are sometimes exacerbated by the unexpected nature of a natural conversation. Other applications of computerized speech analysis are directed to analyzing speech and language characteristics independently of the content of the speech. For example, systems have been developed for automatic acoustic phonetic analysis aimed at describing the manner in which a person is speaking rather than what the person is saying. These analytic approaches have been used extensively in applications such as voice stress analysis, lie detection applications and clinical applications.

During the past decade neuropsychological testing has become very sophisticated. There are dozens of frequently used neuropsychological tests. Tests that are currently available are standardized, highly accurate, and possess a high degree of predictive accuracy. Neuropsychological testing is regarded as highly accurate (80-95%). These tests are properly administered by healthcare professionals. Tests such as verbal fluency rely on their own trained perceptions plus standardized test scores. These professionals lack sophisticated computerized tools to investigate either the content or the form of the patient's performance on the test at a deeper level.

SUMMARY

In general, techniques are described for automating speech analysis and the calculation of verbal fluency characteristics, such as calculating verbal fluency scores. In one example, an analysis system collects data from a patient's speech and extracts prosodic characteristics of the patient's speech. The patient may have a speech impairment, such as aphasia caused by fronto-temporal dementia (FTD), Alzheimer's disease or a precursor thereof, schizophrenia, epilepsy, autism spectrum disorders including Asperger's syndrome, side effects caused by medication, or other impairments. The system is equipped to automatically analyze the data to determine, for example, fluency of a patient's speech. The system analyzes a recorded audio stream (e.g., a wave file) of the patient's speech to automatically identify samples that include speech and samples that include silence (or background noise). The system then counts, for example, the number of instances of contiguous silence, i.e., the length and number of pauses in speech.

Additionally or alternatively, the system may also measure and count the duration and number of contiguous speech segments, which are, in some instances, presumed to be words. The speech segments may include more than one actual words or may include a word fragment—for the purposes of this disclosure, such segments may be recognized as words. In some implementations, the system then discerns the duration of each pause and word, and calculates an average (such as a mean value) of the durations. In these implementations, the system calculates the standard deviation of the durations from the mean, and removes words and silences with durations that fall outside of two standard deviations of the mean. A verbal fluency (VF) score for the speech sample based on the pause and word durations and counts is then calculated. VF tests may take various forms, such as phonemic, semantic, and others. Phonemic VF tests present a patient with a letter or sound, and call for the patient to speak as many words including (e.g., starting with) the letter or sound within a predetermined time period. Semantic VF tests present a patient with a concept (e.g., word category), and call for the patient to speak as many words falling within the concept in a predetermined period of time.

In one example, a method includes classifying, by a computing device, samples of audio data of speech of a person, based on amplitudes of the samples and on a silence threshold, into a first class of samples including speech or sound and a second class of samples including silence. The method further includes analyzing the first class of samples to determine a number of words spoken by the person, and calculating a verbal fluency score for the person based at least in part on the determined number of words spoken by the person.

In another example, a device includes a memory and one or more programmable processors. The programmable processor(s) are configured to classify samples of audio data of speech of a person, based on amplitudes of the samples and on a silence threshold, into a first class of samples including speech or sound and a second class of samples including silence. The programmable processor(s) are further configured to analyze the first class of samples to determine a number of words spoken by the person, and calculate a verbal fluency score for the person based at least in part on the determined number of words spoken by the person.

In another example, a computer-readable medium includes instructions. The instructions, when executed, cause a processor to classify samples of audio data of speech of a person, based on amplitudes of the samples and on a silence threshold, into a first class of samples including speech or sound and a second class of samples including silence. The instructions, when executed, further cause the processor to analyze the first class of samples to determine a number of words spoken by the person, and calculate a verbal fluency score for the person based at least in part on the determined number of words spoken by the person.

The techniques described herein may present several advantages. For example, the techniques may provide for automatic analysis of verbal fluency of a patient's speech. Thus, a patient's speech may be analyzed without, for example, a manual transcription thereof. The techniques therefore provide for automatic analysis of spontaneous speech from the patient. In many scenarios, the techniques enable patients to self-administer a VF test, i.e., patients are able to generate their own VF scores without the aid of a physician, neuropsychologist, clinician, or other professionals in the field.

The techniques of this disclosure may provide one or more advantages. For example, these techniques may use advanced analytical methods to evaluate spoken words to deliver more complete, insightful, systematic and objective evaluations of verbal fluency that can potentially aid in the diagnosis of Alzheimer's, dementia, and learning disabilities. In addition, these techniques may deliver objective measurement of the benefit from pharmaceutical and physical therapies for these conditions.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-6C are conceptual diagrams illustrating user interfaces (UIs) displayed by a computing device as the computing device runs a verbal fluency test for a patient, in accordance with one or more aspects of this disclosure.

DETAILED DESCRIPTION

Figure 1:
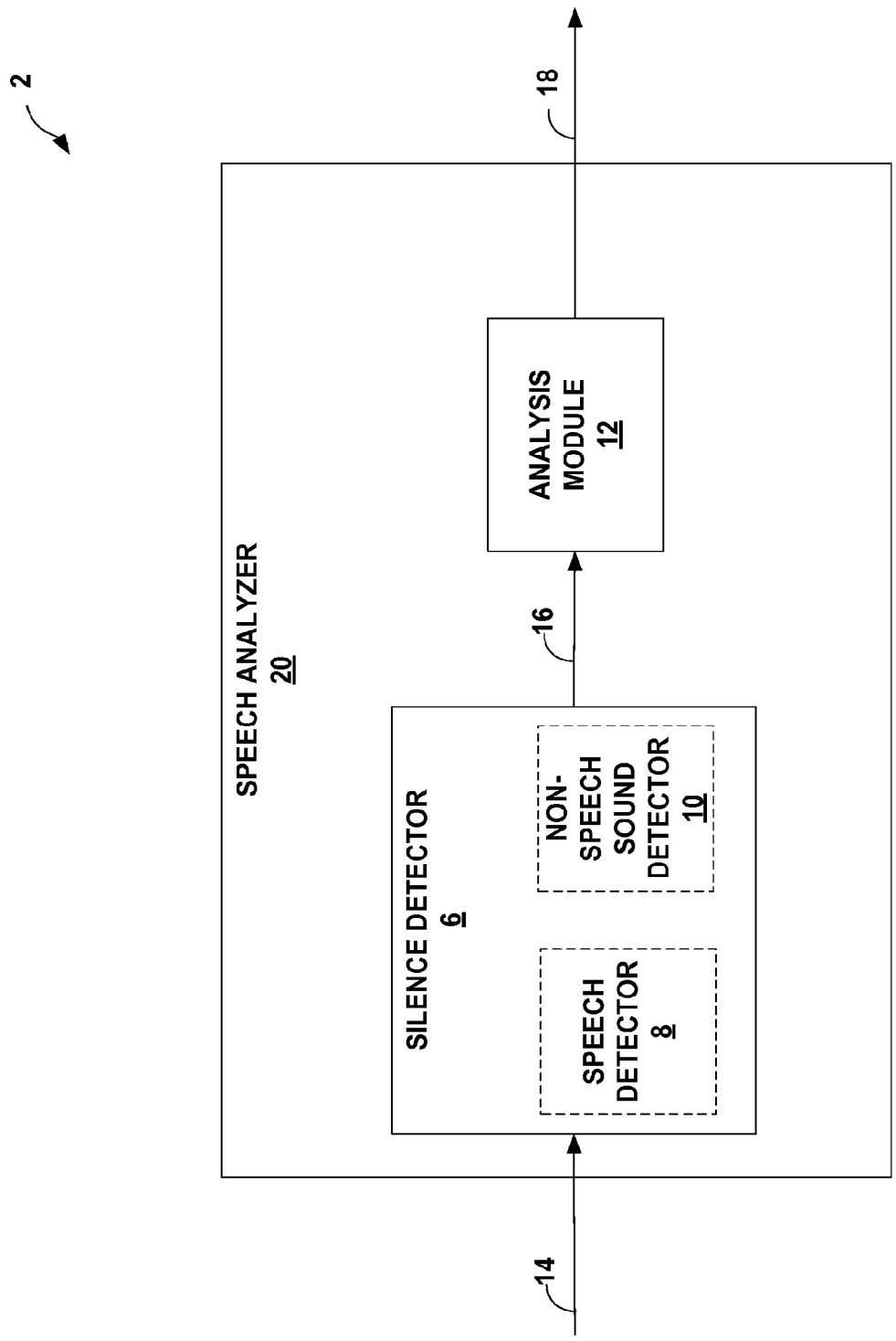
FIG. 1 is a block diagram illustrating example system 2 for automatically collecting and analyzing speech data to calculate a patient's VF score.

FIG. 1 is a block diagram illustrating example system 2 for automatically collecting and analyzing speech data to calculate a patient's VF score. System 2 includes speech analyzer 20 that analyzes input audio 14 to produce speech analysis, including VF score 18 as output. Speech analyzer 20 may also be referred to as a "speech analysis device" in this disclosure. Audio 14 generally includes an audio sample of speech from a patient. Audio 14 may include, for example, an audio recording, live speech from a patient, a data file, or other input format that includes a sample of speech from a patient. Speech analyzer 20 may receive audio 14 through a microphone, from an interface to a sound recorder, from a database or other data storage system, or by other means. In various scenarios, audio 14 includes continuous, spontaneous speech from the patient.

In general, speech analyzer 20 may be configured to administer a test of phonemic and/or semantic fluency, and to automatically (i.e., without user intervention) analyze speech from a person during the test. The test may, for example, include requesting that a patient name as many words belonging to a semantic category (e.g., "animals," "plants," etc.) or a phonemic category, (e.g., words that begin with the letter "F") as possible during a particular period of time, e.g., 60 seconds. Another example of the test includes requesting the patient asked to recall a list of words that were spoken to him/her either immediately prior to testing or at some earlier point during testing (known as "word recall" testing). In various implementations, speech analyzer 20 may form part of a device, such as a smart phone, tablet computer, laptop computer, desktop computer, or the like, such that a person can self-administer the test at a location of choice. In some examples, speech analyzer 20 may be included in a device that a user may access remotely for self-administered testing, such as by telephone or other network-based audio communication. The device may capture audio 14 and send audio 14 to speech analyzer 20. In this manner, speech analyzer 20 may attempt to detect as many words spoken during the period of time of the audio recording.

Empirical testing has demonstrated that measuring the number of words spoken during such a test correlates approximately by 60-80% to words spoken during a test depending on how the test is administered and the resulting amount of repeated words, disfluencies, intrusions of voice from other people (e.g., an examiner or test administrator) and errors (e.g., words that do not fit the specified category). In general, experimental results may indicate that the number of words, regardless of whether the words are correct, and pauses counted in the manner presented in this disclosure is associated with the number of correct words determined manually. Furthermore, experimental results tend to show that statistical models designed to classify patients into those with and without dementia have equivalent performance (with approximate correlation of 0.70, or 70%) with either the manual or automatic scores in the model. Furthermore, experimental results tend to demonstrate that adding one or more of the automatically-derived measures such as the voice stability measurements obtained through measuring the standard deviation in fundamental frequency may help improve classification into dementia and non-dementia categories performed with models containing manually-computed scores.

In this manner, speech analyzer 20 may not, in some scenarios, be required to verify that the words actually fit the specified category. Instead, in such scenarios, speech analyzer 20 may simply determine the number (or "count") of words spoken during the audio recording to determine a score for the test. In some examples, speech analyzer 20 may be configured to determine words that fit the specified category and to remove repeated or otherwise redundant words. However, the detection and removal of redundant words may not be necessary in all scenarios to produce a statistically meaningful or accurate score, in accordance with the techniques of this disclosure.

In one example, speech analyzer 20 is a module of a computing device, such as a server computer or a workstation computer. In another example, speech analyzer 20 is a module of a stand-alone analysis device. All or part of speech analyzer 20 may be implemented in hardware, software, firmware, or any combination thereof. Speech analyzer 20 receives and analyzes audio 14 to produce speech analysis that includes VF score 18. VF score 18 may indicate, for example, the number of words spoken during audio 14. VF score 18 may also indicate and/or be based on information indicating a number of pauses and/or durations of pauses, as discussed below. In examples, VF score 18 may indicate a raw measure of a number of utterances in audio 14 supplied by a subject, such as a patient.

In another example, speech analyzer 20 may calculate an estimate of voice pitch or the fundamental frequency and the mean and standard deviation of the fundamental frequency for each word/speech segment. Speech analyzer 20 may then use the averaged standard deviation of the fundamental frequency as one of the speech characteristics indicative of voice pitch stability, either by itself or in combination with the counts and mean durations of pauses and words in the speech sample, to produce a value for the speaker. The value may be indicative of whether the speaker has a potential to develop a disability or impairment, or whether the speaker has an actual disability or impairment, in some examples.

Speech analyzer 20 operates to automatically analyze speech of audio 14. That is, speech analyzer 20, in one example, does not require the assistance of a human user to identify elements of speech of audio 14. Instead, speech analyzer 20 identifies words and silences within audio 14 without the aid of a human-made transcription of audio 14. In this manner, speech analyzer 20 automatically produces speech analysis that includes a calculation or estimate of a patient's verbal fluency (VF) score 18, from an analysis of relevant words and pause durations of the patient's speech.

In the example of FIG. 1, speech analyzer 20 includes silence detector 6 and analysis module 12. In various implementations, silence detector 6 may include one or more components, such as speech detector 8 and/or non-speech sound detector 10. Components such as speech detector 8 and non-speech sound detector 10 are optional, as indicated by dashed line borders. In the example of FIG. 1, silence detector 6 is operable to identify portions of audio 14 that qualify as "silence" for purposes of VF testing. In the context of VF testing, silence may conform to traditional definitions, such as gaps in speech, as well as VF-specific definitions, such as murmurs, filled pauses (e.g., "ah" or "umm"), extraneous noise, casual conversation (e.g., with an examiner administering the VF test), and the voices of individuals other than the patient (e.g., an examiner, clinician, test administrator, passerby, etc.).

Silence detector 6 sends output 16 to analysis module 12. Analysis module 12 measures fluency of the patient's speech based on output 16 received from silence detector 6. In one example, analysis module 12 measures pause-related information, such as the number of pauses, and the duration of each pause. In this and other examples, analysis module 12 measures speech-related information, such as pitch (exhibited by the fundamental frequency of the wave function of the speech), voice recognition (to isolate the voice of the patient being tested), score comparison (to determine how well a patient learns when taking the same test multiple times), and others. Analysis module 12, in several implementations, calculates an average value (e.g., the mean) of the pause durations, and a corresponding standard deviation of the pause durations from the mean. In some examples, analysis module 12 calculates the logarithm (or "log"), calculated with respect to a constant value used as a base, of each pause duration as part of the analysis. Based on one or more of the pause durations (and/or their corresponding log values), the speech durations, and other data extracted from output 16, analysis module 12 calculates estimated VF score 18. Analysis module 12 may output estimated VF score 18 through a variety of channels, such as a display device, a network interface, a telephonic interface, etc.

Speech analyzer 20 may operate in an automated or semi-automated fashion. These techniques may be operated over various networks, such as the Internet. For example, a device may capture audio data and transmit data over the Internet live or after recording to a device including speech analyzer 20. Speech analyzer 20 may also produce or generate one or more objective measurements of speech and language characteristics from spontaneous speech or speech that is read from various sources. Moreover, speech analyzer 20 may analyze and quantify a variety of speech characteristics, including prosody, hesitations, pitch, fundamental frequency fluctuations, degree of phonological repetitiveness of speech, rhythm, and duration.

Unlike conventional devices and techniques, speech analyzer 20 may analyze spectral characteristics, such as fundamental frequency and fluctuations in fundamental frequency. Speech analyzer 20 may also analyze rhythm characteristics and phrasing length based on rhythmic phrases. Speech analyzer 20 may be configured with a fully automated method for measuring a number of prosodic characteristics (silent and filled pause length and frequency, repetition frequency, fundamental frequency and fluctuations in fundamental frequency, voice jitter, acoustic and phonemic similarity across adjacent speech segments).

Speech analyzer 20 provides one or more potential advantages. For example, speech analyzer 20 may analyze captured speech. In contrast, many currently-available VF tests rely on the listening skills of a healthcare professional. Speech analyzer 20 may be fully automated, may correlate scores to cognitive impairment and enhancement, and may not require use of a complicated manual transcription, such as those delivered by a medical professional. Moreover, speech analyzer 20 may be implemented to operate over the Internet or telephone (cellular or landline), and speech analyzer 20 may enable patients to avail of the functionalities of speech analyzer 20 either independently or with a healthcare professional. Speech analyzer 20 may provide other useful measurements for language and speech disorders. Speech analyzer 20 may also be useful for monitoring deteriorating or improving cognitive abilities over time, such as improvements due to therapeutic interventions.

Speech analyzer 20 may be deployed in a variety of scenarios. For example, in a clinical setting, speech analyzer 20 may be used to provide technical methods and analysis for standardized and objective neuropsychological assessments. In a clinical research setting, speech analyzer 20 may provide a tool for testing neuropsychological outcomes in clinical trials of cognitive enhancing and cognitive impairing medications. In healthcare and consumer markets, speech analyzer 20 may be Web-enabled for a website that can be accessed by physicians and scientists to conduct neuropsychological assessments, and to store and analyze the results.

Figure 2:
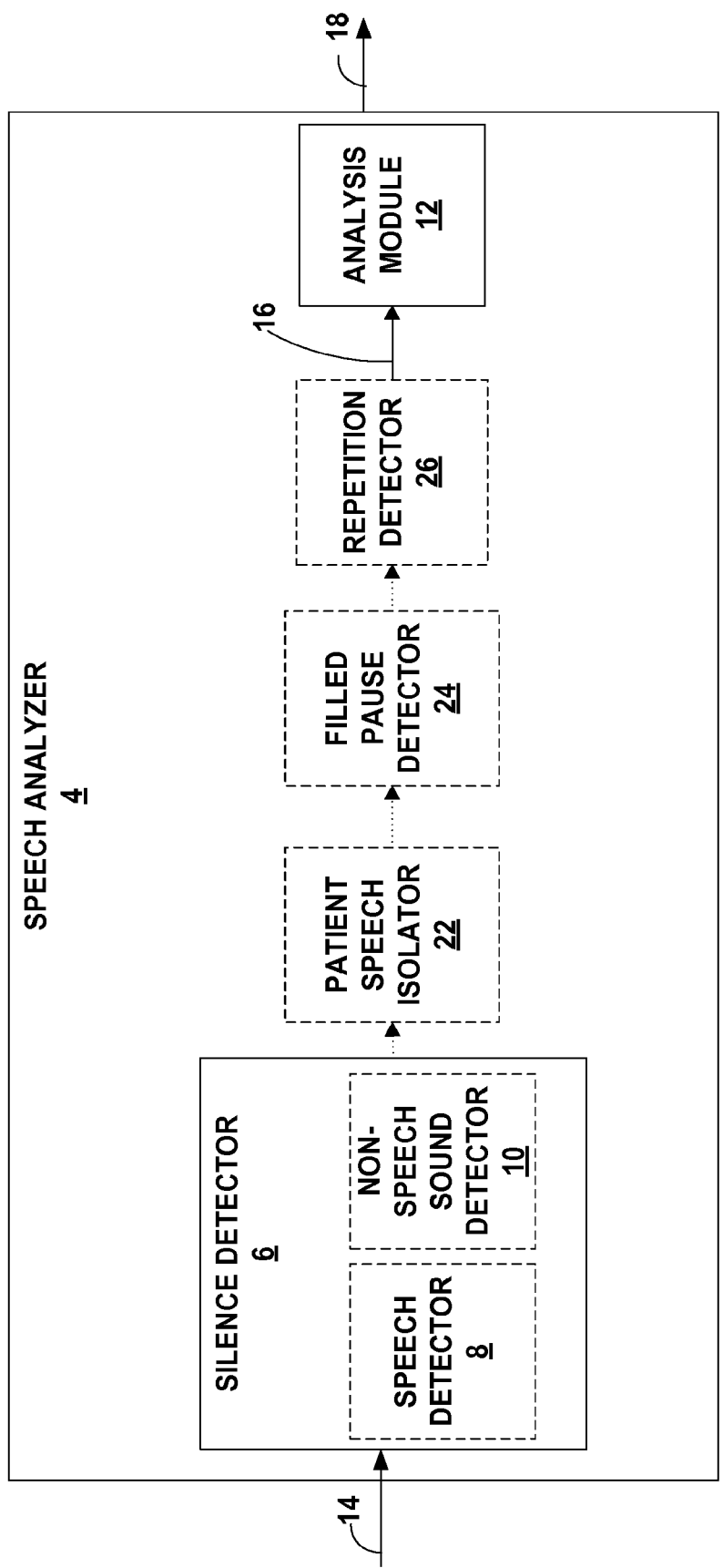
FIG. 2 is a block diagram illustrating an enhanced implementation of speech analyzer 20 described with respect to FIG. 1.

FIG. 2 is a block diagram illustrating an enhanced implementation of speech analyzer 20 described with respect to FIG. 1. Commonly numbered elements of FIGS. 1 & 2 share similar functionalities, and are not described separately with respect to FIG. 2. Speech analyzer 4 of FIG. 2 includes three optional components, namely, patient speech isolator 22, filled pause detector 24, and repetition detector 26. Each of patient speech isolator 22, filled pause detector 24, and repetition detector 26 may be capable of implementing one or more functionalities described with respect to analysis module 12 in FIG. 1, as well as additional functionalities.

For example, patient speech isolator 22 is equipped to perform voice recognition. Using voice recognition, patient speech isolator 22 delineates the voice of the patient from any other voices and/or extraneous sounds in audio 14. By delineating the patient's voice from other parts of audio 14 that are irrelevant to the VF test, patient speech isolator 22 enables analysis module 12 to more accurately target those portions of output 16 that are relevant to the calculation of estimated VF score 18. In some examples, patient speech isolator 22 creates vector clusters of the audio samples, and correlates larger clusters to belong to the patient. In this manner, patient speech isolator 22 may isolate a particular patient's speech from, e.g., other speech in an audio recording, such as a clinician or other examiner's voice. Moreover, patient speech isolator 22 may be configured to assume that voice characteristics in an initial portion of an audio recording, e.g., the first ten seconds, corresponds to the patient. Based on the voice characteristics included in the initial portion, patient speech isolator 22 determines whether sounds of the audio recording, subsequent to the initial portion, match or closely resemble the voice characteristics of the initial portion. In turn, patient speech isolator 22 may eliminate sounds having voice characteristics other than those matching (or closely resembling) the voice characteristics of the first portion of the audio recording determined to include speech of the patient, thereby enabling analysis module 12 to more accurately target those portions of output 16 that are relevant to the calculation of estimated VF score 18 for the patient.

Filled pause detector 24 is functional to detect portions of audio 14 that qualify as de facto silence, such as a patient's explicit or implicit attempts to substitute pauses in speech with one or more of non-words (e.g., "umm"), filler words (e.g., "like"), etc. In some examples, filled pause detector 24 detects such filled pauses, and flags the filled pauses so that analysis module 12 can disregard the filled pauses while calculating estimated VF score 18. In other examples, filled pause detector 24 removes the filled pauses, leaving traditional pauses (silence) of the corresponding durations. In these examples, output 16 includes pauses corresponding to the length of the original filled pauses of audio 14, enabling analysis module 12 to consider the pauses when calculating estimated VF score 18. In this manner, filled pause detector 24 feeds analysis module 12 with traditional pauses where a filled pause may otherwise conceal the pause in test-relevant speech. Filled pause detector 24 may be configured according to the techniques described in Pakhomov et al., "AUTOMATIC MEASUREMENT OF SPEECH FLUENCY," U.S. patent Ser. No. 12/652,535, filed Jan. 5, 2010, which is incorporated by reference in its entirety. In another example, filled pause detector 24 may rely on the output of an automatic speech recognition system with access to acoustic and language models are configured to recognize speech fillers.

Repetition detector 26 enables analysis module 12 to flag, disregard, or otherwise handle repetitive words in audio 14. In many instances, the parameters of a VF test may call for non-repetition of words. For example, one or both of a phonemic VF test and semantic VF test may call for a patient to speak as many unique words as possible in a predetermined length of time. Repetition of a word during a VF test may, in some examples, be symptomatic of a lack of cognition or other neuropsychological disorder, and detecting the repetition may aid in diagnosis. Repetition detector 26 may implement, as one example, speech recognition technology to detect repeated words in audio 14, and optionally edit output 16 accordingly. In one example, repetition detector 26 flags repeated words in output 16, thus enabling analysis module 12 to disregard or otherwise take the repetition into account when calculating estimated VF score 18. In another example, repetition detector 26 removes one or more repeated words, thus creating pauses in output 16 where the repeated words would have originally been located. In this example, repetition detector 26 enables analysis module 12 to treat repeated words as a pause when calculating estimated VF score 18.

In some examples, speech analyzer 4 implements techniques of this disclosure to test for cognitive disorders (or other disorders) that measure or are otherwise associated with a patient's ability to learn. In these and other examples, speech analyzer 4 implements techniques of this disclosure to enable one or more other devices to test for such disorders. More specifically, speech analyzer 4 may administer repeated VF tests to a same patient, optionally using the same test type (e.g., phonemic or semantic), and optionally using the same stimulus (e.g., the same letter as a stimulus for multiple phonemic VF tests). Speech analyzer 4 may plot each instance of VF score 18, as estimated for each test, on a graph, and use the slope of the graph to determine or evaluate the patient's ability to learn. For instance, a steeper upward slope may indicate better learning ability, while a gradual upward slope or a downward slope may be symptomatic of cognitive degradation. Experimental research illustrates differences between the trajectories of the scores obtained on VF tests between subjects with normal cognition and subjects with mild cognitive impairment ("MCI"). More specifically, subjects with normal cognition tend to demonstrate larger practice effects between first and second presentation of the same test. In turn, the practice effects for subjects with normal cognition tend to diminish or become smaller between second and third presentations of the same test, and smaller still between third and fourth presentations of the same test.

On the other hand, for subjects with MCI, the practice effects between the first and second presentation of the same test tend to be smaller than for control subjects, and the practice effects tend to reach a plateau after the second presentation. In other words, the practice effects between second and third presentations of the same test may not diminish when compared to the practice effects between the first and second presentations. Thus, speech analyzer 4 may use the magnitude of the differences in VF scores between second and third, and between first and second presentations of the same test to distinguish between subjects with normal cognition and subjects with signs, including early signs, of cognitive impairment. While existing studies on practice effects over a short time window focus on a VF test with time intervals such as ten minutes, techniques of this disclosure differ, in that the techniques solicit the subject to repeat the same task several times in a row, thus reducing the total amount of time required for testing, and thereby creating better conditions for practice effects to occur in order to mitigate possible intervening confounders between test presentations.

Figure 3:
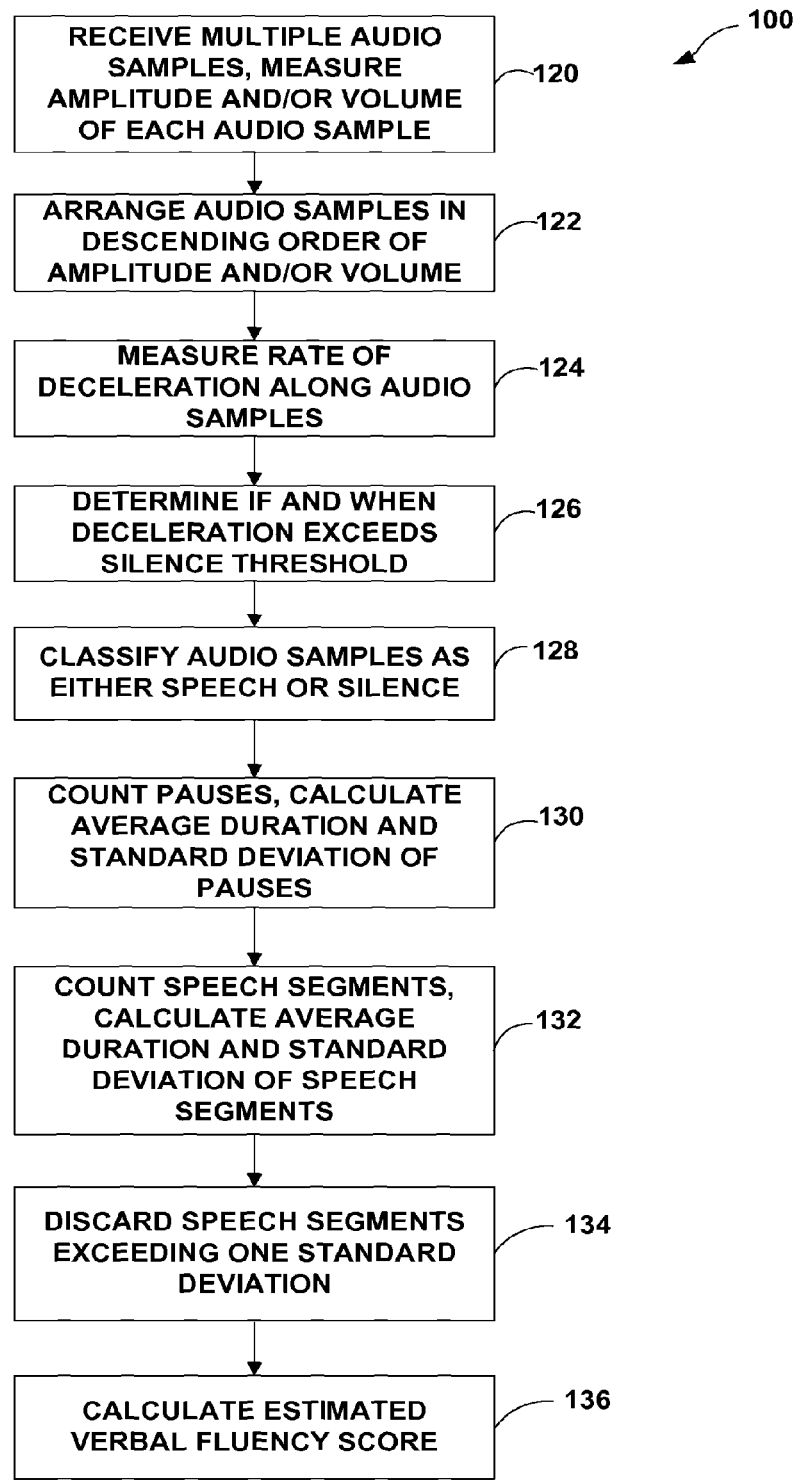
FIG. 3 is a flowchart illustrating an example process by which a device may implement techniques of this disclosure.

FIG. 3 is a flowchart illustrating an example process by which a device may implement techniques of this disclosure. While process 100 may be implemented by any device or module described herein, for ease of discussion, process 100 is described herein with respect to speech analyzer 4 of FIG. 2, and to data represented by graph 500 of FIG. 5. Process 100 begins when silence detector 6 receives audio 14 (120). Silence detector 6 parses (or "fragments") audio 14 into multiple audio samples. In one illustrative example, silence detector 6 parses audio 14 using a frequency of 16 kHz. In this example, each audio sample has a duration of 6.25e-5 seconds. Silence detector 6 then measures the volume of each sample (120). For example, silence detector 6 measures the amplitude of the wave expression of each audio sample. The amplitude of a wave corresponds to the volume of the corresponding audio sample.

Figure 5:
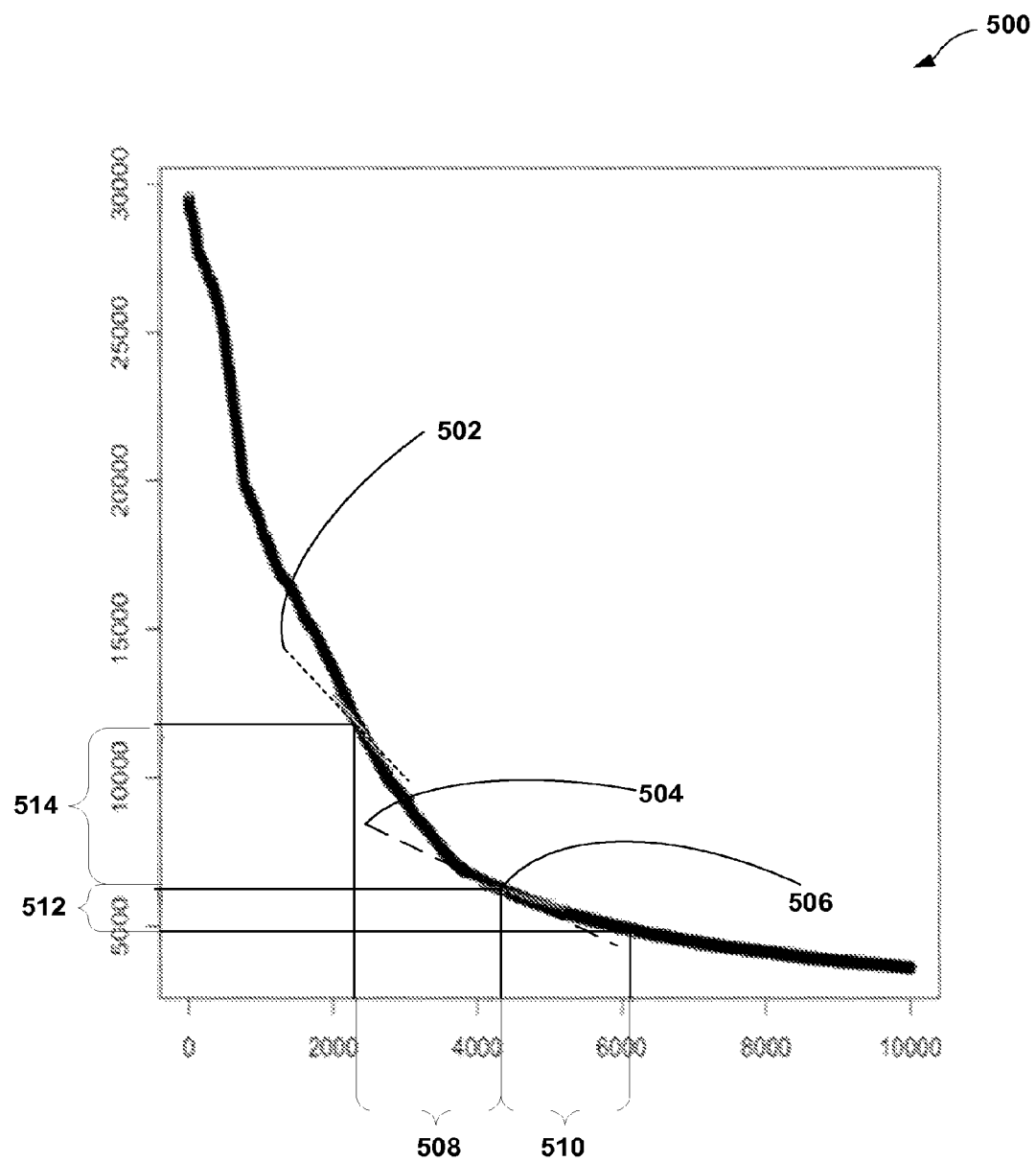
FIG. 5 is a graph illustrating amplitudes of audio samples arranged in descending order of amplitude.

Silence detector 6 then arranges the audio samples in descending order of volume (122). An example of such an arrangement is shown in FIG. 5, as discussed in greater detail below. As discussed, silence detector 6 discerns the volume of each audio sample based on the amplitude of the corresponding wave. Additionally, silence detector 6 measures the rate of deceleration along the audio samples (124). To measure the deceleration, silence detector 6 graphs the volume of the audio samples (as arranged in descending order), and measures the downward slope of the curve. That is, speech analyzer 20 sorts all samples in the input signal in the descending order of the respective values (e.g., amplitude/volume). The sorting results in a curve that represents the distribution of intensities across all samples in the input, such as the curve shown in FIG. 5. For VF tests, a curve as illustrated in FIG. 5 represents a long-tailed exponential distribution with relatively few samples with high intensity that quickly drops off. FIG. 5 illustrates the top 10,000 samples captured during a VF test audio recording after the samples have been sorted.

To identify those audio samples that qualify as silence, silence detector 6 determines if and at what point the deceleration exceeds a silence threshold (126). Beginning at the top of the curve (e.g., at the first sample), silence detector 6 moves down the curve in steps, or increments, of N samples. For each point on the curve, silence detector 6 calculates the change in amplitude over the preceding step of N samples (508 in the example of FIG. 5) and the following step of N samples (510 in the example of FIG. 5). Although not drawn to scale, both 508 and 510 are associated with a step size of N samples, and are associated with equal traversals along the x-axis of the curve. The change in amplitude over 508 is called out as 514 in FIG. 5, and the change in amplitude over 510 is called out as 512. In instances where 512 represents a greater amplitude change than the amplitude change represented by 514, the change in amplitude is considered to be decelerating rapidly. Conversely, in instances where 512 represents a smaller, or lesser, amplitude change than the amplitude change represented by 514, the deceleration in amplitude is considered to be slowing.

The silence threshold is a predetermined value (in some implementations, determined by silence detector 6), such as a slope of −1.0 or 0.0. On a graph, such as graph 500 illustrated in FIG. 5, the point where the samples fall below the silence threshold may be represented by an inflection point (described in more detail with respect to FIG. 5). Silence detector 6 classifies each audio sample as either sound or silence (128). A potential challenge presented by the techniques of process 100 is associated with determining the point on the curve at which the rate of deceleration decreases sufficiently to indicate crossing a silence threshold. To mitigate any issues that may arise from such potential challenges, silence detector 6 is configured to perform linear regression modeling over the series of amplitude values in each time step, as silence detector 6 traverses the curve of FIG. 5 in descending order.

In examples, silence detector 6 proceeds in steps of 1000 samples along the curve, using an overlapping window of 500 samples, resulting in overlapping frames of 1000 samples, each with an overlap size of 500 samples. For each step, silence detector 6 may fit a linear model to the samples in each frame. Silence detector 6 may use model parameters that include an intercept a measure of regression, such as a beta coefficient on the independent variable (in this case, the sample number). The beta coefficient is the slope of the fitted line, and serves as an indicator of the rate of change in amplitude over each frame. At a point of the curve where the slope exceeds a threshold (e.g., of −0.2, as has resulted from empirical testing), silence detector 6 determines the midpoint of the frame as the silence threshold. Silence detector 6 may configure a level of silence detection by manipulating the size of the step (e.g., expressed in samples/frames) and overlap, as well as by manipulating the threshold for the beta coefficient. Additionally, silence detector 6 may calibrate the level of silence detection to achieve a minimum performance level in various acoustic environments, such as through experimental or trial-error techniques.

In place of, or in addition to the linear modeling techniques described above, silence detector 6 may use one or more techniques to determine a point on the curve at which the rate of deceleration decreases sufficiently to indicate crossing a silence threshold. In one example, silence detector 6 fit a non-linear function to the curve, and uses the first derivative of the non-linear function to estimate the rate of change in amplitude values on the curve. In still another example, silence detector 6 is configured to use an empirically determined heuristic that defines a coefficient representing the ratio between the respective amplitude changes of 512 and 514 in FIG. 5. In this example, silence detector 6 determines the threshold, or "cutoff" value for the coefficient empirically. In some scenarios encountered through experiments, the techniques based on linear modeling produce the more accurate results than the results obtained through alternative approaches. In this manner, silence detector 6 may classify as silence, audio samples that have sound below a certain volume, if the corresponding amplitude of the volume is below the silence threshold. On a graph, such as graph 500 of FIG. 5, all audio samples below the inflection point fall under the "silence" classification. Based on the classification, silence detector 6 may create subsets of audio samples, each subset belonging to either a speech category or a silence category.

Figure 4:
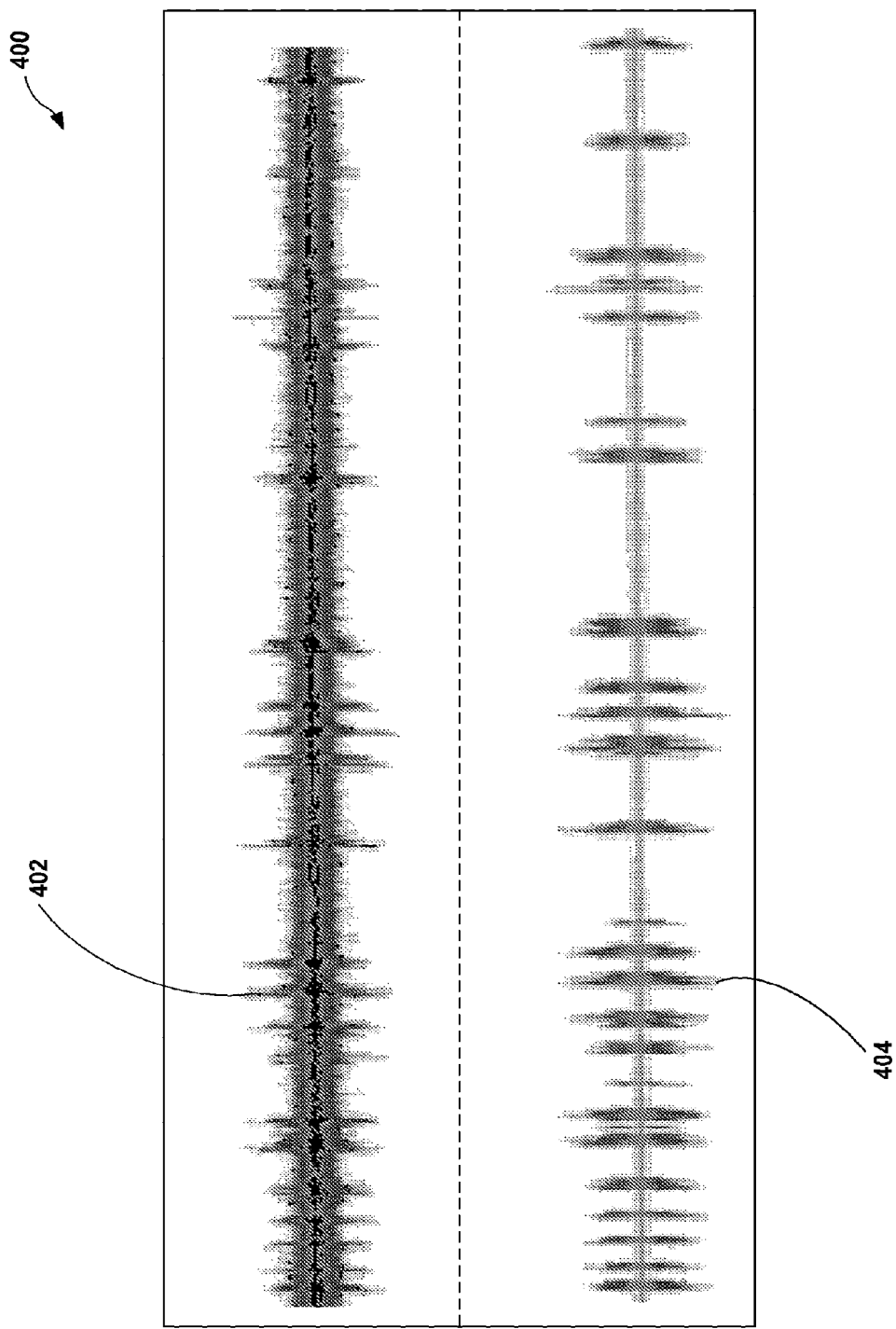
FIG. 4 is a set of wave diagrams corresponding to raw audio input and processed audio, in accordance with one or more aspects of this disclosure.

Additionally, analysis module 12 counts pauses in output 16 (130). In general, silence detector 6 may treat the silence threshold as the point at which the intensity distribution plateaus. More specifically, in this example, the silence threshold indicates that silence detector 6 may treat all samples below the silence threshold as silence or constant background noise, and conversely, treat all samples above the silence threshold as speech. Once silence detector 6 identifies the silence threshold, silence detector 6 may input, and compare the intensity value of each sample to the silence threshold. If the intensity of each sample is lower than the silence threshold for more than a minimum number of consecutive samples, then silence detector 6 marks or otherwise identifies such samples as "silence." In one example, silence detector 6 uses a minimum silence duration parameter of 500 milliseconds, and may express the duration in terms of a number of consecutive samples that form the duration of 500 milliseconds. On the other hand, if silence detector 6 does not detect the minimum number of consecutive samples with intensities below the silence threshold, then silence detector 6 marks or otherwise identifies the encountered samples as "speech." Silence detector 6 may allow short bursts of samples exceeding the silence threshold that are shorter than a predetermined duration, e.g., 30 milliseconds, and treat the short bursts of silence as part of the surrounding silence segments. FIG. 4, discussed in greater detail below, illustrates an example of a recording of a VF test associated with a noisy environment or acoustic setting. More specifically, FIG. 4 illustrates an upper panel and a lower panel, which respectively, are associated with "before" and "after" automatic silence detection processing performed by silence detector 6 using one or more of algorithms and techniques described above. By implementing the algorithms and techniques described above, silence detector 6 leverages one or more specific characteristics of VF tests that tend to have relatively little speech and relatively greater silence, leading to a long-tailed distribution on the curve when the audio samples are sorted.

Thus, to count pauses in an audio sample, analysis module 12 identifies all speech samples that were classified as silence by silence detector 6. Analysis module 12 also calculates an average (e.g., mean) duration of the pauses, as well as the corresponding standard deviation of the pauses from the average duration (130). To calculate the average duration, analysis module 12 first discerns how many consecutive audio samples silence detector 6 classified as silence, prior to the samples being arranged in descending order of volume. Analysis module 12 then calculates the average duration and standard deviation based on the constructed durations. In this manner, after silence detector 6 has categorized each sample in the input as either "silence" or "speech", analysis module 12 may calculate the average pause duration and standard deviation therefrom, of the silent segments. More specifically, analysis module 12 may determine pause durations that are specific to the individual speaker, and use the average duration and standard deviation to define the concept of a "pause" as a silent segment that is longer than the mean plus one standard deviation. Pauses exceeding the value of the mean plus one standard deviation, may, in some instances, be more likely to represent inter-word silences than intra-word silences or shorter silences that are characteristic of spontaneous speech. Thus, by avoiding counting shorter pauses, silence detector 6 may mitigate or eliminate inaccuracies arising from extraneous speech produced by subjects during the VF test, such as by asking for clarification, making expressions of embarrassment, asides, etc.

Additionally, analysis module 12 counts speech segments in audio 14, and calculates the average and standard deviation of the durations of the speech segments (132). After the audio has been classified into the categories of "speech" and "silence," silence detector 6 may proceed to define spoken words in a manner similar to defining silent pauses as described above. As one example, silence detector 6 calculates the mean duration for spoken segments, and the standard deviation therefrom, of the speech segments. Additionally, in this example, analysis module 12 discards all speech segments that are longer in duration than one standard deviation above the mean. Such speech segments that exceed the mean duration by more than one standard deviation are likely to be extraneous speech, such as comments spoken by the patient/subject, rather than words to be counted on the VF test. Furthermore, high levels of background noise, such as microphone channel noise or an air conditioning unit running in the background, may produce bursts of high amplitude signals that are exceed the silence threshold, even if the amplitudes only exceed the silence threshold marginally. To avoid counting these extraneous segments as actual speech for purposes of the VF test, silence detector 6 may use a signal processing technique for fundamental frequency detection that is otherwise used in pitch tracking to estimate human voice pitch.

For example, silence detector 6 may use pitch estimation based on autocorrelation of the power spectrum generated with a Fast Fourier Transform (FFT) algorithm. In this and other examples, silence detector 6 may implement other pitch tracking techniques known in the art. After silence detector 6 estimates the fundamental frequency over the entire duration of the audio, silence detector 6 may check each audio segment classified as "speech" for the presence of a fundamental frequency. If silence detector 6 does not detect any fundamental frequency estimates, or detects a number of fundamental frequency estimates that is below a threshold count, within the boundaries of the audio segment, silence detector 6 may discard the audio segment. More specifically, silence detector 6 may exclude such an audio segment from being counted for purposes of the VF test. In some implementations, silence detector 6 may check for fundamental frequency estimates at points of the speech sample that correspond to vowel sounds (e.g., sounds pronounced or otherwise provided by a subject with an open vocal tract or open jaw). Empirical testing demonstrates that using pitch tracking as described herein may improve the results of a VF tests, such as by increased correlative accuracy.

Silence detector 6 may determine pitch, which forms an integral part of harmonics analysis, to be expressed by the fundamental frequency of a waveform. In the context of VF testing, silence detector 6 may determine that greater pitch variations tend to indicate non-test speech, such as casual conversation with the examiner Conversely, silence detector 6 may determine that less pitch variations (e.g., as might be the case with more monotone speech) tend to indicate test-relevant speech, as a patient who is listing words in non-sentence form may be more likely to speak the words in a relatively monotonous or less expressive fashion, with relatively less inflection of pitch.

With respect to analyzing audio segments classified as speech, analysis module 12 may use similar logic as described above with respect to analyzing audio segments classified as silence. However, in the case of audio segments classified as speech, analysis module 12 may apply the logic to those audio samples positioned above the inflection point of the graph. More specifically, analysis module 12 may apply the logic to those audio samples that have a volume higher than the silence threshold. Analysis module 12 may discard speech segments that have a duration exceeding one standard deviation from the average (134). By discarding speech segments that deviate from the average by more than the standard deviation, analysis module 12 may eliminate those speech samples corresponding to noise (e.g., cough, sneeze, extraneous noise) that are too short to qualify as test-relevant words. Similarly, analysis module 12 may eliminate those speech segments that are too long to qualify as test relevant words (e.g., casual conversation with the examiner). Analysis module 12 calculates estimated VF score 18 based on the pause and/or speech durations. Furthermore, in some examples, speech analyzer 4 may perform process 100 several times, measuring a number of words each time, to determine a "curve" for the patient. The curve may indicate improvement or diminishment in test performance for each instance. Speech analyzer 4 may compare a patient's curve with curves representative of known-encumbered subjects and known-unencumbered subjects, to categorize the patient as either being likely encumbered or likely unencumbered, and recognize consultation with a clinician if the user is likely encumbered.

Process 100 of FIG. 3 may provide one or more potential advantages. For example, process 100, or portions thereof, may be implemented for fully automated assessment of semantic and phonemic verbal fluency performance-metrics that are widely used to assess cognitive impairment and clinical manifestations of a variety of neurological and developmental conditions including but not limited to, Alzheimer's disease and related neurodegenerative diseases, epilepsy, stroke, traumatic brain injury, autism, and learning disabilities. Additionally, because process 100 utilizes hesitations in speech rather than words produced on VF tests, process 100 may be applicable to tests conducted in various languages as well as in environments and scenarios with noise and poor quality channels. In this manner, process 100 may be universally applicable, such as in the context of language and audio capture quality. Additionally, silence detection algorithms associated with process 100 are robust. For instance, techniques of this disclosure, such as process 100, have been implemented successfully on digitized speech generated from audio tapes that were recorded in 1992. Thus, the techniques may be implemented with equal or possibly greater success and accuracy with respect to audio data captured from telephone speech (e.g., cellular telephone speech), which, in examples, tends to be of lower quality due to background noise and/or channel noise.

Experimental research tends to indicate that the number of pauses ("PCNT," defined as silent segments that are longer than the mean pause duration plus one standard deviation above the mean), the mean pause duration ("MPDUR"), and the total number of spoken segments ("SSCNT") as defined above, exhibit correlation with the VF scores obtained from recorded neuropsychological testing sessions of 39 healthy subjects ("n=39") in a study referred to herein as the "NunStudy." As examples, PCNT exhibits a correlation value, referred to herein as "Spearman rho," of 0.77 (or 77%), MPDUR exhibits a Spearman rho value of 0.80, and SSCNT exhibits a Spearman rho of 0.7 according to the techniques of this disclosure. Thus, the techniques, such as process 100, may be used as a surrogate measure of performance on such VF tests. For instance, experimental research indicates that clinician-administered implementations of the techniques of this disclosure yield VF scores that exhibit correlation in the range of 0.8-0.84 to manual analysis by a psychiatrist to arrive at a VF score.

An additional potential advantage provided by the techniques over manual VF testing is that the techniques, such as process 100, can be implemented in a fully automatic manner. For instance, a fully automatic implementation of process 100 may only require an input that includes a digital recording of a subject's (e.g., patient's) speech, which may be obtained using any number of widely available devices. Examples of such devices include digital and/or analog recorders, desktop and laptop computers equipped with sound cards, mobile devices such as smartphones, tablet computers, personal digital assistants (PDAs), as well as conventional telephones and mobile telephones. Experimental research indicates that fully automatic (or self-administered) implementations of the techniques of this disclosure using a phone or tablet computer yield VF scores that exhibit correlation of 0.9 and above to manual analysis by a psychiatrist to arrive at a VF score.

Process 100 of FIG. 3 represents an example of a method including classifying, by a computing device, samples of audio data of speech of a person, based on amplitudes of the samples and on a silence threshold, into a first class of samples including speech or sound and a second class of samples including silence, analyzing the first class of samples to determine a number of words spoken by the person, and calculating a verbal fluency score for the person based at least in part on the determined number of words spoken by the person.

FIG. 4 is a set of wave diagrams corresponding to raw audio input and processed audio, in accordance with one or more aspects of this disclosure. Wave diagram 400 includes an upper pane denoting raw audio input 402 and a lower pane denoting processed audio 404. For illustration purposes, the panes are separated by a dashed line. Both panes of wave diagram 400 illustrate audio data by plotting duration (time) on the x-axis and volume (amplitude) on the y-axis. Raw audio input 402 represents audio received during a VF test by a device implementing the techniques of this disclosure. A device may implement the techniques (e.g., by signal processing) to output processed audio 404.

As shown, only those portions of raw audio input 402 having a certain amplitude or higher may remain in processed audio 404. Conversely, lower amplitude portions of raw audio input 402 may be omitted from processed audio 404. In some enhanced implementations, portions of processed audio 404 may also be discarded, based on factors such as duration, having an amplitude that exceeds a threshold (e.g., amplitude being too high), and pitch (e.g., fundamental frequency). In particular, portions of processed audio 404 for which a fundamental frequency cannot be calculated need not be treated as words in accordance with the techniques of this disclosure. Instead, portions of processed audio 404 for which a fundamental frequency cannot be calculated are treated as non-speech sounds, and thus, not counted as words.

FIG. 5 is a graph illustrating amplitudes of audio samples arranged in descending order of amplitude. In the example of graph 500, the silence threshold is determined to correspond to a downward slope of −1.0. Graph 500 includes a point, namely, inflection point 506, where the deceleration of the curve exceeds the silence threshold (or approximate silence threshold, as FIG. 5 is not drawn to scale. A device implementing the techniques of this disclosure, such as speech analyzer 20 of FIG. 1, may determine that all audio samples positioned to the right of inflection point 506 to constitute silence for purposes of VF testing.

To illustrate the deceleration of the curve of graph 500 toward inflection point 506, FIG. 5 includes first slope indicator 502 and second slope indicator 504. First slope indicator 502 is associated with the amplitude change denoted by 514. For purposes of this example, first slope indicator 502 is considered to indicate a slope (or "β" value) that is within the silence threshold of −1.0. As a result of first slope indicator 502 being associated with a deceleration value within the silence threshold, speech analyzer 20 may continue to classify samples positioned on the curve of graph 500, and to the right of the intersection between first slope indicator 502 and the curve, to constitute audio samples of speech.

On the other hand, second slope indicator 504 is associated with a slope that exceeds the deceleration associated with the silence threshold, namely, a β value of −1.0. As shown in FIG. 5, second slope indicator 504 intersects with the curve of graph 500 at inflection point 506, at which point speech analyzer 4 detects the silence threshold for the collected audio samples. Based on second slope indicator 504 exceeding the deceleration value for the silence threshold (i.e., intersecting with the curve at inflection point 506), speech analyzer 4 may classify all speech samples positioned to the right of inflection point 506 as silence.

Figure 6A:
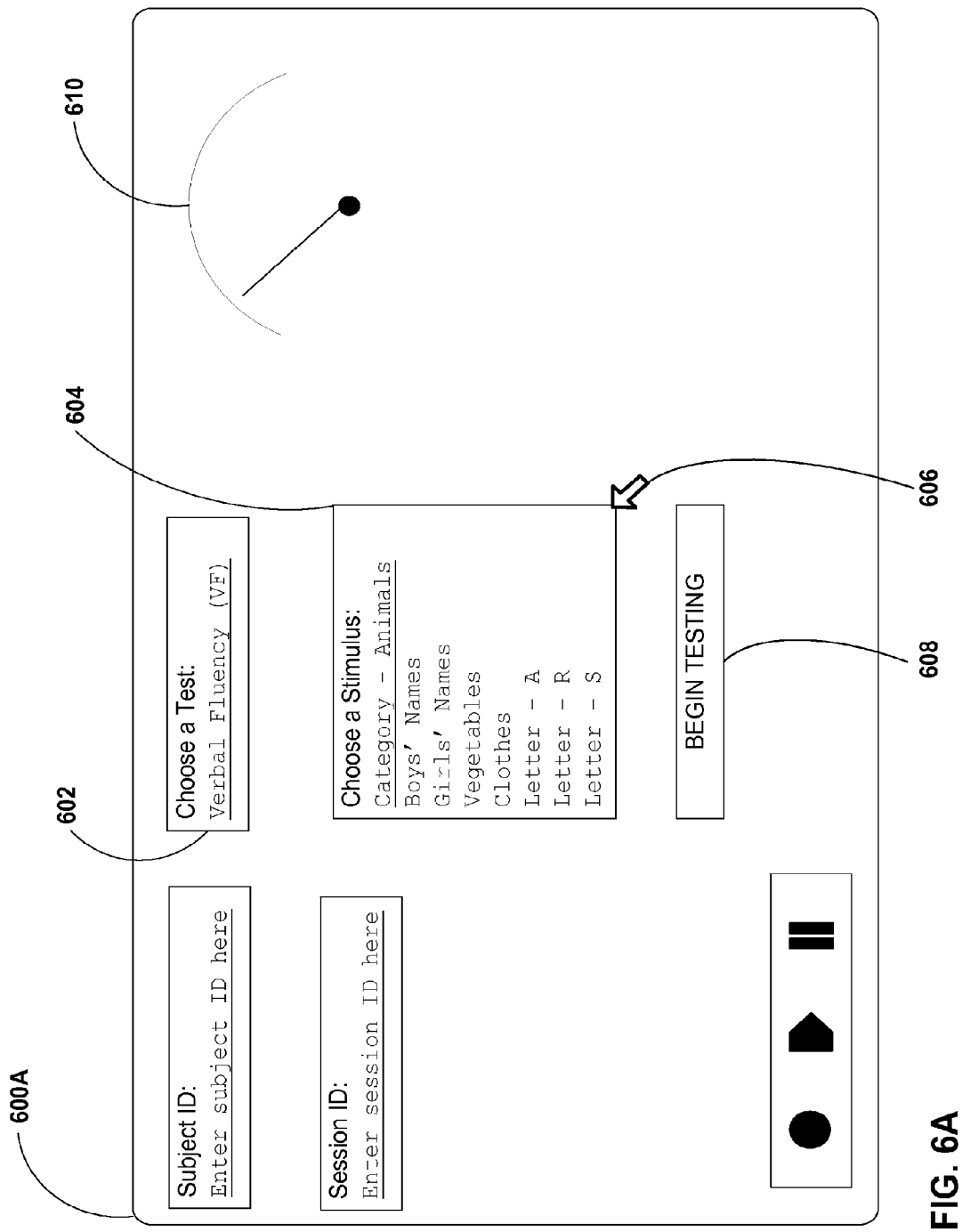
Figure 6C:
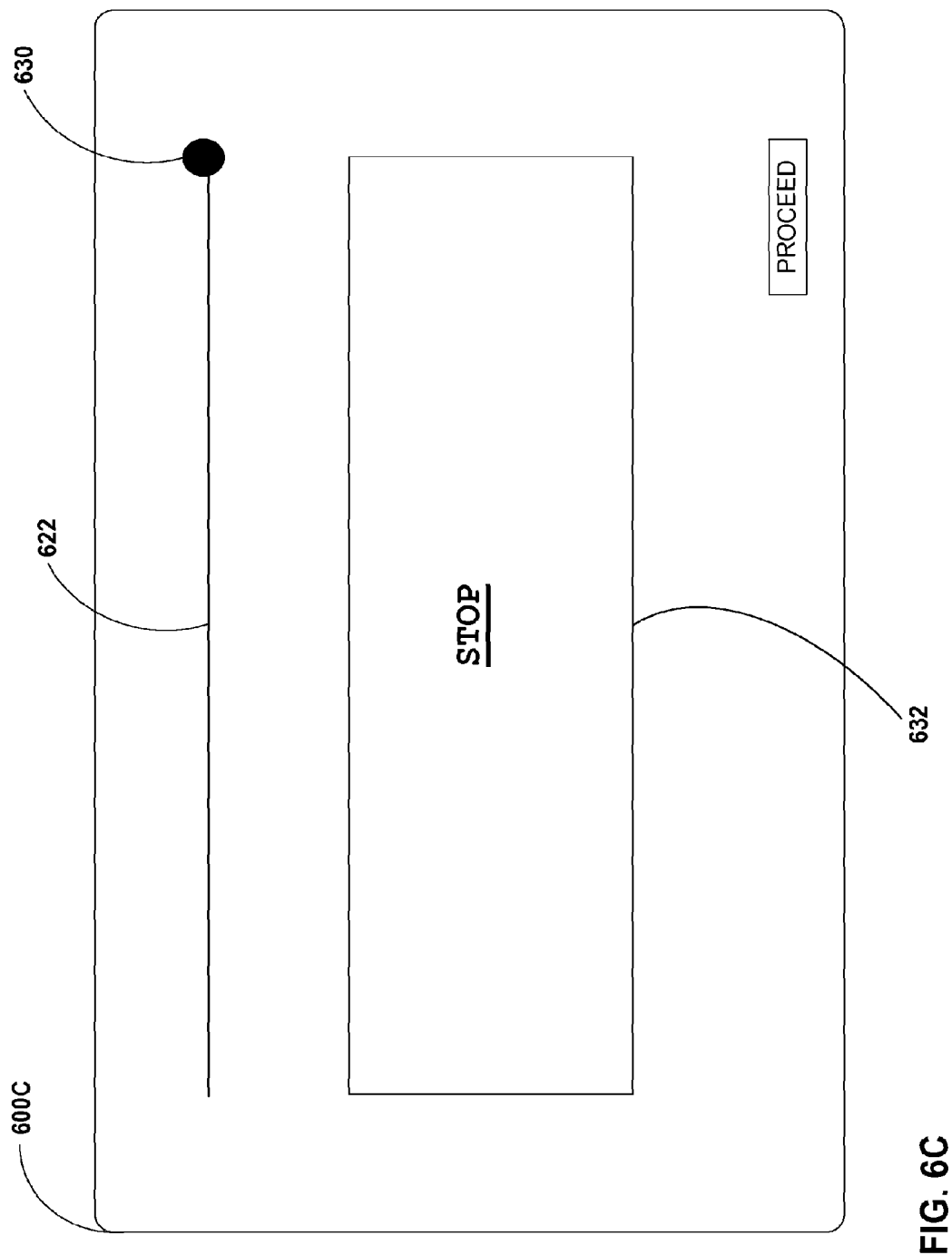

FIGS. 6A-6C are conceptual diagrams illustrating user interfaces (UIs) displayed by a computing device as the computing device runs a verbal fluency test for a patient, in accordance with one or more aspects of this disclosure. In the particular example of FIGS. 6A-6C, the computing device used is a mobile computing device (in this case, a tablet computer). In other examples, the computing device may include, be, or be part a variety of types of devices, such as a mobile phone (including a smartphone), ultrabook, netbook, laptop, desktop, personal digital assistant ("PDA"), television, and watch, among others. FIG. 6A illustrates a UI 600A, that enables a user (e.g., a patient, clinician, or other test administrator) to input various data and select criteria on which to base a test to be administered. In the implementation illustrated in FIG. 6A, GUI 600A includes test-type menu 602 and stimulus menu 604. The user may, for example, activate a dropdown menu at test-type menu 602, and select a particular type of neuropsychological test, such as the verbal fluency (VF) test displayed in FIG. 6A. Additionally, the tablet computer that displays GUI 600A is configured to enable the user to activate the dropdown menu illustrated with respect to stimulus menu 604.

In one example, the tablet computer receives an input, such as through contact with a stylus or the user's finger, placing cursor 606 at stimulus menu 604. In turn, the tablet computer activates the dropdown menu illustrated with respect to stimulus menu 604, thereby offering the user the choice between various stimuli upon which to base the VF test. As shown, stimulus menu 604 includes various stimuli associated with semantic tests (e.g., word categories), as well as phonemic tests (e.g., letters and/or sounds). More specifically, the first five options listed in stimulus menu 604 are associated with semantic test stimuli, while the last three options are associated with phonemic test stimuli. In various examples described herein, a selected stimulus, such as the "animals" sematic category, is referred to as a "seed" upon which the VF test is based.

As shown in FIG. 6A, GUI 600A also includes test activation button 608 (labeled "Begin Testing" in this specific example) that the user may select to begin running the VF test. For instance, the user may place cursor 606 at test activation button 608, and provide a tap input to virtually actuate test activation button 608. GUI 600A also includes sound test meter 610. Prior to beginning the VF test or other test requiring audio input, the user may determine whether one or more microphones of the tablet computer are functioning, or determine whether the user should reposition the tablet computer for audio capture, by observing a sound quality reading displayed via sound test meter 610.

FIG. 6B illustrates UI 600B, which the tablet computer may display once the user begins running the VF test, such as after selecting the test type and stimulus, and beginning the test by virtually actuating test activation button 608 illustrated in FIG. 6A. In the example of FIG. 6B, the user has selected a semantic VF test, based on a seed word category of "animals." The word category of the selected seed is specified as part of seed display 624 of GUI 600B while the tablet computer runs the VF test. In various implementations of the techniques described herein, seed display 624 may form an optional element of GUI 600B. As one example, the tablet computer may omit seed display 624 from GUI 600B in instances of low remaining battery power. In the example of FIG. 6B, seed display 624 indicates a semantic theme (in this case, a word category. In other scenarios, seed display 624 may indicate a phonemic theme, such as a letter or an indication of a sound with which words are to start, end, or include. In some implementations, GUI 600B may include one or more optional GUI elements that indicate words spoken by the subject during the VF test, such as a full list of words spoken, the most recent word, spoken, or a real-time evaluation of whether the spoken word(s) fit the theme set by the selected seed.

GUI 600B also includes test progress indicator 620 and progress bar 622. The tablet computer that runs the VF test may position test progress indicator 620 along progress bar 622 to indicate a proportion of the VF test that has been completed so far. For instance, the position of test progress indicator 620 on progress bar 622 may indicate a ratio of time elapsed during the VF test to the total time of the VF test. In examples, the tablet computer may modify GUI 600B dynamically, to indicate real-time progress of the VF test, such as by moving progress indicator 620 from left to right on progress bar 622 as the VF test advances.

FIG. 6C illustrates GUI 600C, which the tablet computer displays after the VF test has ended, such as by reaching a preprogrammed time limit (e.g., 60 seconds). GUI 600C includes ending indicator 630 positioned at the rightmost end of progress bar 622. Additionally, GUI 600C includes optional stop notification 632, which instructs a the patient to stop listing words per the selected VF test seed. After the VF test has been administered to completion, the tablet computer may perform one or more techniques of this disclosure to calculate a score for a user who participated in the test and store the testing results in a database or deliver the results back to the user through a user interface, e-mail, or other suitable communication channels.

Though described herein largely with respect to volume, techniques of this disclosure may include analysis of other audio features, such as pitch. Pitch may be expressed by the fundamental frequency of a waveform, and forms an integral part of analysis of harmonics. In the context of VF testing, greater pitch variations may indicate non-test speech, such as casual conversation with the examiner Conversely, less pitch variations (e.g., as might be the case with more monotone speech) may indicate test-relevant speech, as a patient who is listing words in non-sentence form may be more likely to speak the words in a relatively monotonous or less expressive fashion, with relatively less inflection of pitch.

Although several of the techniques described herein utilize signal processing techniques to identify and quantify silent and speech segments of the audio, in various implementations, the techniques may be implemented to use a conventional automatic speech recognition engine to produce a rough, or approximate transcription of the audio sample provided by the subject during the VF test in place of spoken and silent segments identified by the current approach. The speech recognizer algorithms may segment the audio into speech and silence segments based on words or phonemes. Subsequent signal processing, including pitch tracking, may be performed on segments of the audio identified by the speech recognizer algorithms as words or contiguous phonemes.

A device implementing techniques of this disclosure may also display various interfaces to a user (e.g., a patient who self-administers the test). The interface may display one or more of the phonemic theme (e.g., word sounds), semantic theme (e.g., word category), the words actually spoken by the patient, etc.

Techniques of this disclosure may also enable testing of cognitive or other disorders by measuring a patient's ability to learn. The same test may be given to a patient multiple times within a relatively short time window. For example, a phonemic fluency test using the same letter may be presented to the patient multiple times within a given time period. Each estimated VF score may be plotted on a graph, and the slope may indicate the patient's ability to learn. A steeper upward slope may indicate better learning ability, while a gradual upward slope or a downward slope may be symptomatic of cognitive degradation. Experimental research has shown that there are significant differences between the trajectories of the scores obtained on VF tests between cognitively normal subjects and subjects with mild cognitive impairment ("MCI"). The former show larger practice effects between first and second presentation of the same test that become smaller between second and third and even smaller between third and fourth presentation. For subjects with MCI, the practice effects between first and second presentation are significantly smaller than for controls and reach a plateau after the second presentation. Thus, the magnitude of the differences in VF scores between second and third, and between first and second presentations may be used to distinguish between healthy and subjects with early signs of cognitive impairment. While prior work on practice effects over a short time window has focused on the time interval of 10 minutes, techniques of this disclosure differ from the prior work, by soliciting the subject to repeat the same task several times in a row, thus reducing the total amount of time required for testing and creating better conditions for practice effects to occur in order to eliminate any possible intervening confounders between test presentations.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In this manner, instructions for one or more software programs or modules may be stored on a non-transitory, computer-readable storage medium or a computer-readable storage device. The instructions may be executed by one or more hardware-based processors or hardware-based processing units.

Various examples have been described. These and other examples are within the scope of the following claims.

What is claimed is:

1. A method comprising:
   obtaining, by a computing device via a speech analyzer, a waveform representing a digital recording of audio speech of a person, the speech analyzer comprising at least one of a microphone, an interface to a sound recorder, an interface to a database, or an interface to a data storage system;
   measuring, by the computing device, amplitudes of waves within the waveform, the waves corresponding to samples of the digital recording of the audio speech of the person;
   classifying, by a silence detector of the computing device, the samples of the digital recording of the audio data of the speech of the person, based on the measured amplitudes of the samples and on a silence threshold, into a first class of samples including speech or sound and a second class of samples including silence, wherein classifying the samples comprises:
      sorting, by the silence detector, the samples of the audio data in an order defined by the amplitudes of the samples of the audio data;
      determining, by the silence detector, the silence threshold based on the amplitudes of the samples of the audio data, wherein determining the silence threshold comprises:
         calculating, by the silence detector, linear regressions of the sorted samples in the sorted order; and
         determining, by the silence detector, the silence threshold as the amplitude of one of the samples for which a slope of the calculated linear regression exceeds a predetermined value;
      classifying, by the silence detector, samples having amplitudes above the silence threshold as belonging to the first class; and
      classifying, by the silence detector, samples having amplitudes below the silence threshold as belonging to the second class;
   analyzing, by the computing device, the first class of samples to determine a number of words spoken by the person;
   calculating, by the computing device, a verbal fluency score for the person based at least in part on the determined number of words spoken by the person, and
   outputting, by the computing device, the verbal fluency score.

2. The method of claim 1, wherein the predetermined value comprises −0.2.

3. The method of claim 1, wherein analyzing the first class of samples comprises determining a first subset of samples of the first class including speech sound and a second subset of samples of the first class including non-speech sound.

4. The method of claim 3, further comprising determining the number of words as a number of contiguous samples in the audio data belonging to the first subset that start with a sample above the silence threshold and end with a sample below the silence threshold.

5. The method of claim 3, wherein determining the first subset and the second subset comprises:
   classifying contiguous samples in the first class of the audio data for which a fundamental frequency can be calculated as belonging to the first subset; and
   classifying contiguous samples in the first class of the audio data for which a fundamental frequency cannot be calculated as belonging to the second subset.

6. The method of claim 1, further comprising:
determining a number of pauses as a number of contiguous samples in the second class that start with a sample below the silence threshold and end with a sample below the silence threshold.

7. The method of claim 6, further comprising:
measuring a duration associated with each pause of the pauses;
calculating an average duration comprising a mean value of the measured durations; and
calculating a standard deviation of the measured durations from the average duration.

8. The method of claim 1, further comprising:
classifying, by the computing device, second samples of second audio data of speech of the person, based on second amplitudes of the second samples and on a second silence threshold, into the first class and the second class;
calculating a second verbal fluency score based at least in part on the number of words spoken by the person; and
calculating a learning score based at least in part on a change from the verbal fluency score to the second verbal fluency score.

9. The method of claim 8, wherein the silence threshold and the second silence threshold comprise equal values.

10. The method of claim 8, wherein calculating the learning score further comprises:
plotting at least the verbal fluency score and the second verbal fluency score on a graph; and
calculating a slope associated with the graph.

11. The method of claim 1, further comprising:
receiving the samples as at least a portion of a verbal fluency test of the person.

12. The method of claim 11, further comprising:
outputting the verbal fluency score.

13. The method of claim 1, wherein analyzing the first class of samples comprises excluding non-speech sounds in the first class of samples from the number of words spoken by the person, comprising:
calculating an average duration of the samples in the first class of samples;
calculating a standard deviation of durations of the samples in the first class of samples; and
classifying samples having durations that deviate from the average duration by at least one standard deviation as non-speech sounds.

14. The device of claim 13, wherein to analyze the first class of samples, the one or more processors are configured to exclude non-speech sounds in the first class of samples from the number of words spoken by the person, and wherein to exclude the non-speech sounds, the one or more processors are configured to:
calculate an average duration of the samples in the first class of samples;
calculate a standard deviation of durations of the samples in the first class of samples; and
classify samples having durations that deviate from the average duration by at least one standard deviation as non-speech sounds.

15. A device comprising:
a memory storing instructions defining at least a silence detector;
a speech analyzer comprising at least one of a microphone, an interface to a sound recorder, an interface to a database, or an interface to a data storage system, wherein the speech analyzer is configured to obtain a waveform representing a digital recording of audio speech of a person;
one or more processors configured to execute the instructions, wherein execution of the instructions causes the one or more processors to:
measure amplitudes of waves within the waveform, the waves corresponding to samples of the digital recording of the audio speech of the person;
execute the silence detector to classify the samples of the digital recording of the audio data of the speech of the person, based on the measured amplitudes of the samples and on a silence threshold, into a first class of samples including speech or sound and a second class of samples including silence, wherein to classify the samples, the silence detector is configured to:
sort the samples of the audio data in an order defined by the amplitudes of the samples of the audio data;
determine the silence threshold based on the amplitudes of the samples of the audio data, wherein to determine the silence threshold, the silence detector is configured to:
calculate linear regressions of the sorted samples in the sorted order; and
determine the silence threshold as the amplitude of one of the samples for which a slope of the calculated linear regression exceeds a predetermined value;
classify samples having amplitudes above the silence threshold as belonging to the first class; and
classify samples having amplitudes below the silence threshold as belonging to the second class;
analyze the first class of samples to determine a number of words spoken by the person;
calculate a verbal fluency score for the person based at least in part on the determined number of words spoken by the person; and
output the verbal fluency score.

16. The device of claim 15, wherein to analyze the first class of samples, the one or more processors are configured to:
determine a first subset of samples of the first class including speech sound and a second subset of samples of the first class including non-speech sound.

17. The device of claim 16, wherein to determine the first subset and the second subset, the one or more processors are configured to:
classify contiguous samples in the first class of the audio data for which a fundamental frequency can be calculated as belonging to the first subset; and
classify contiguous samples in the first class of the audio data for which a fundamental frequency cannot be calculated as belonging to the second subset.

18. The device of claim 15, wherein the one or more processors are further configured to:
classify second samples of second audio data of speech of the person, based on second amplitudes of the second samples and on a second silence threshold, into the first class and the second class;
calculate a second verbal fluency score based at least in part on the number of words spoken by the person; and
calculate a learning score based at least in part on a change from the verbal fluency score to the second verbal fluency score.

19. A non-transitory computer-readable medium comprising instructions that, when executed, cause a processor of a computing device to:
- obtain, via a speech analyzer of the computing device, a waveform representing a digital recording of audio speech of a person, the speech analyzer comprising at least one of a microphone, an interface to a sound recorder, an interface to a database, or an interface to a data storage system;
- measure amplitudes of waves within the waveform, the waves corresponding to samples of the digital recording of the audio speech of the person;
- execute a silence detector of the computing device to classify the samples of the digital recording of the audio data of the speech of the person, based on the measured amplitudes of the samples and on a silence threshold, into a first class of samples including speech or sound and a second class of samples including silence, wherein to classify the samples, the instructions for the silence detector cause the processor to:
    - sort the samples of the audio data in an order defined by the amplitudes of the samples of the audio data;
    - determine the silence threshold based on the amplitudes of the samples of the audio data, wherein to determine the silence threshold, the silence detector is configured to:
        - calculate linear regressions of the sorted samples in the sorted order; and
        - determine the silence threshold as the amplitude of one of the samples for which a slope of the calculated linear regression exceeds a predetermined value;
    - classify samples having amplitudes above the silence threshold as belonging to the first class; and
    - classify samples having amplitudes below the silence threshold as belonging to the second class;
- analyze the first class of samples to determine a number of words spoken by the person;
- calculate a verbal fluency score for the person based at least in part on the determined number of words spoken by the person; and
- output the verbal fluency score.

20. The non-transitory computer-readable storage medium of claim 19, wherein the instructions that cause the processor to analyze the first class of samples comprise instructions that cause the processor to exclude non-speech sounds in the first class of samples from the number of words spoken by the person, and wherein the instructions that cause the processor to exclude the non-speech sounds comprise instructions that cause the processor to:
- calculate an average duration of the samples in the first class of samples;
- calculate a standard deviation of durations of the samples in the first class of samples; and
- classify samples having durations that deviate from the average duration by at least one standard deviation as non-speech sounds.

* * * * *